US012169660B2

(12) United States Patent
Imai

(10) Patent No.: US 12,169,660 B2
(45) Date of Patent: Dec. 17, 2024

(54) GLASSES-TYPE INFORMATION DEVICE, AND METHOD AND STORAGE MEDIUM FOR THE SAME

(71) Applicant: CANON KABUSHIKI KAISHA, Tokyo (JP)

(72) Inventor: Yasuhiro Imai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/450,757

(22) Filed: Aug. 16, 2023

(65) Prior Publication Data
US 2023/0418544 A1 Dec. 28, 2023

Related U.S. Application Data

(63) Continuation of application No. PCT/JP2022/004993, filed on Feb. 9, 2022.

(30) Foreign Application Priority Data

Feb. 18, 2021 (JP) .................. 2021-024691

(51) Int. Cl.
G06F 3/14 (2006.01)
G02B 27/01 (2006.01)
G06F 3/01 (2006.01)
G06F 3/0481 (2022.01)
G09F 9/00 (2006.01)
G09G 3/00 (2006.01)
(Continued)

(52) U.S. Cl.
CPC ............ *G06F 3/1454* (2013.01); *G06F 3/011* (2013.01); *G09G 3/001* (2013.01); *G09G 2354/00* (2013.01); *G09G 2370/02* (2013.01)

(58) Field of Classification Search
USPC ........................................ 345/156
See application file for complete search history.

(56) References Cited

U.S. PATENT DOCUMENTS

2012/0302289 A1* 11/2012 Kang .................. G06F 3/016
455/557
2014/0118631 A1* 5/2014 Cho .................. H04N 21/41265
348/836
(Continued)

FOREIGN PATENT DOCUMENTS

JP 2002-244791 A 8/2002
JP 2013-125247 A 6/2013
(Continued)

Primary Examiner — Chineyere D Wills-Burns
(74) Attorney, Agent, or Firm — Canon U.S.A., Inc., IP Division

(57) ABSTRACT

A glasses-type information device configured to execute an application includes at least one memory storing instructions, and at least one processor executing the instructions causing the glasses-type information device to execute display control in such a manner that an image corresponding to an operation unit relating to remote control on the application is projected in a field of vision of a user wearing the glasses-type information device by using the glasses-type information device, the remote control being executed by a linked device held by the user, and execute function control of the application based on a command received from the linked device in accordance with a user operation performed by the user on the linked device.

17 Claims, 15 Drawing Sheets

(51) Int. Cl.
*H04M 1/05* (2006.01)
*H04M 1/72409* (2021.01)

(56) References Cited

U.S. PATENT DOCUMENTS

| | | | | |
|---|---|---|---|---|
| 2014/0139439 A1* | 5/2014 | Park | ...................... | G06F 3/0227 |
| | | | | 345/169 |
| 2014/0198035 A1* | 7/2014 | Bailey | ................... | G06F 3/0484 |
| | | | | 345/156 |
| 2014/0285520 A1* | 9/2014 | Park | ...................... | G06T 19/006 |
| | | | | 345/633 |
| 2014/0351896 A1* | 11/2014 | Koo | .................... | G06F 21/6209 |
| | | | | 726/4 |
| 2015/0061997 A1* | 3/2015 | Chi | ......................... | G06F 1/163 |
| | | | | 345/156 |
| 2015/0261492 A1* | 9/2015 | Kawasaki | ............. | G06F 3/1423 |
| | | | | 345/2.1 |
| 2016/0133052 A1* | 5/2016 | Choi | ...................... | G06F 3/011 |
| | | | | 345/633 |
| 2016/0344882 A1* | 11/2016 | Tsujioka | ............. | H04N 1/00493 |
| 2017/0213377 A1* | 7/2017 | Torii | ....................... | H04N 23/60 |
| 2018/0007488 A1* | 1/2018 | Horowitz | ................ | G06F 3/012 |
| 2018/0284914 A1* | 10/2018 | Yanai | ...................... | G06F 3/017 |
| 2019/0107411 A1* | 4/2019 | Gil | ........................ | G06Q 10/047 |
| 2019/0265780 A1* | 8/2019 | Kim | ................... | G02B 27/0172 |

FOREIGN PATENT DOCUMENTS

| | | |
|---|---|---|
| JP | 2016-506530 A | 3/2016 |
| JP | 2019-036914 A | 3/2019 |
| JP | 2021-119431 A | 8/2021 |
| WO | 2006/064717 A1 | 6/2006 |

\* cited by examiner

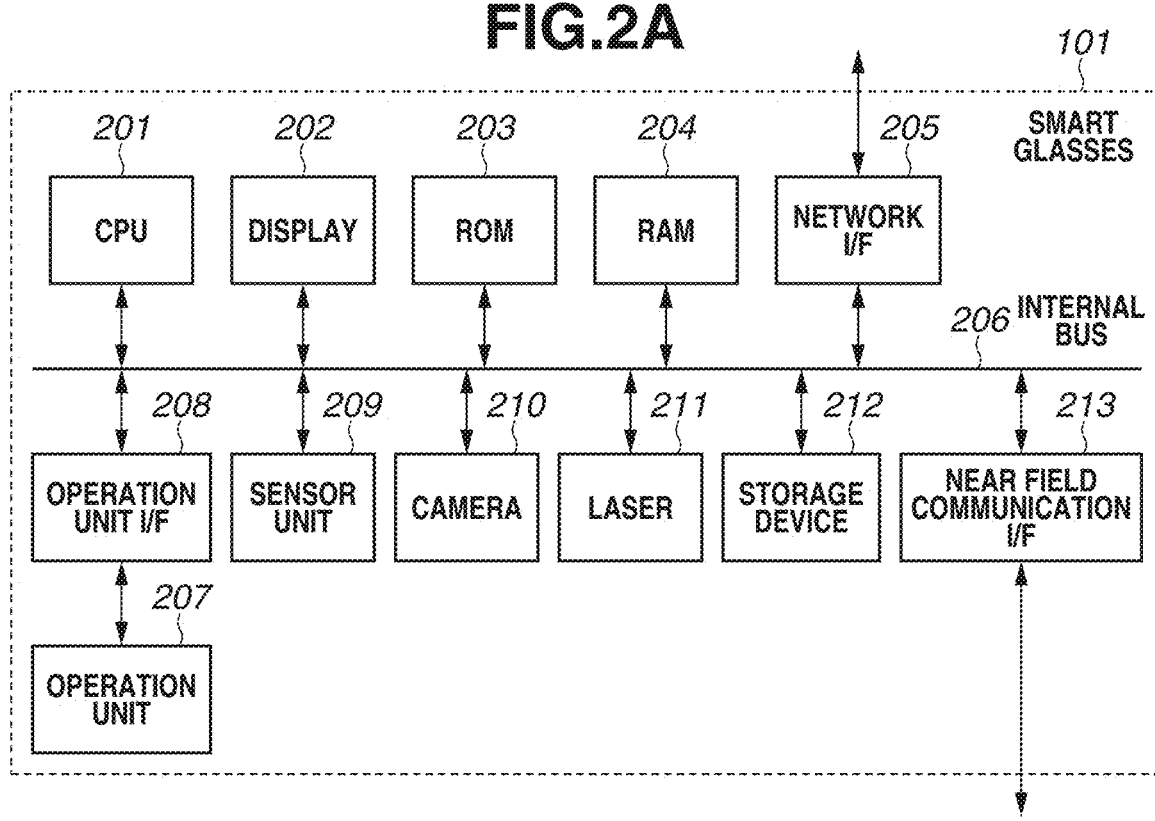
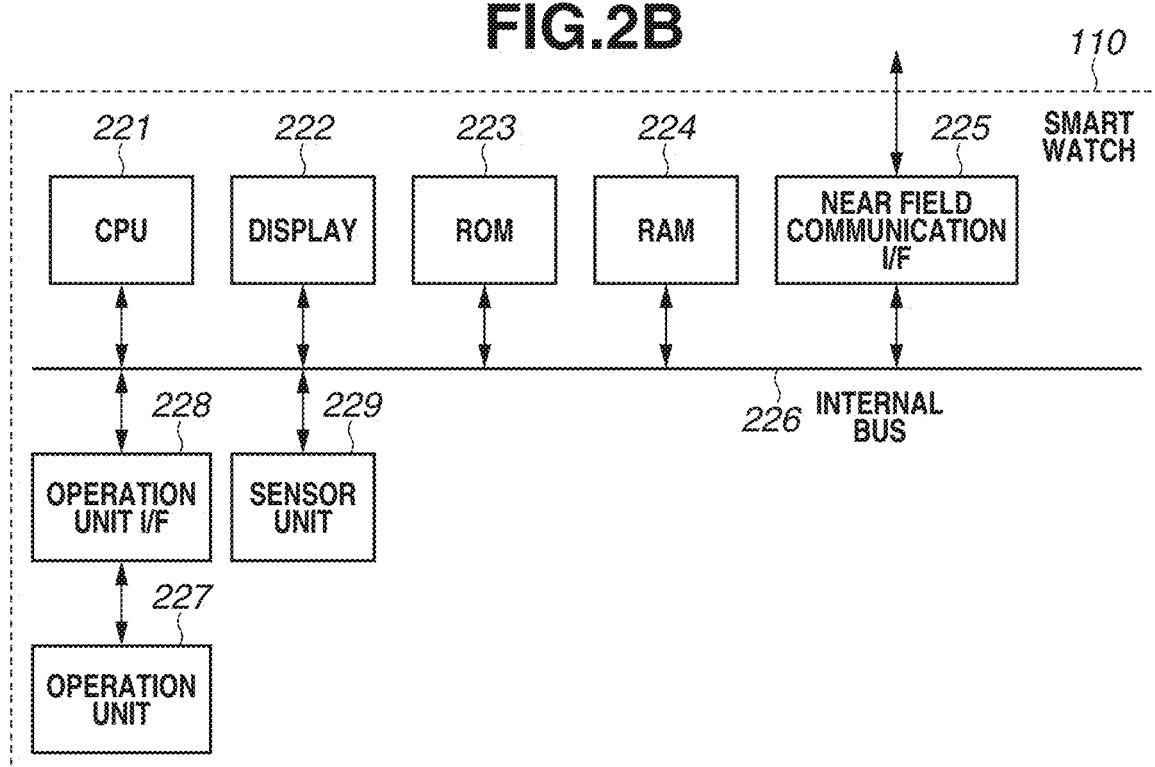

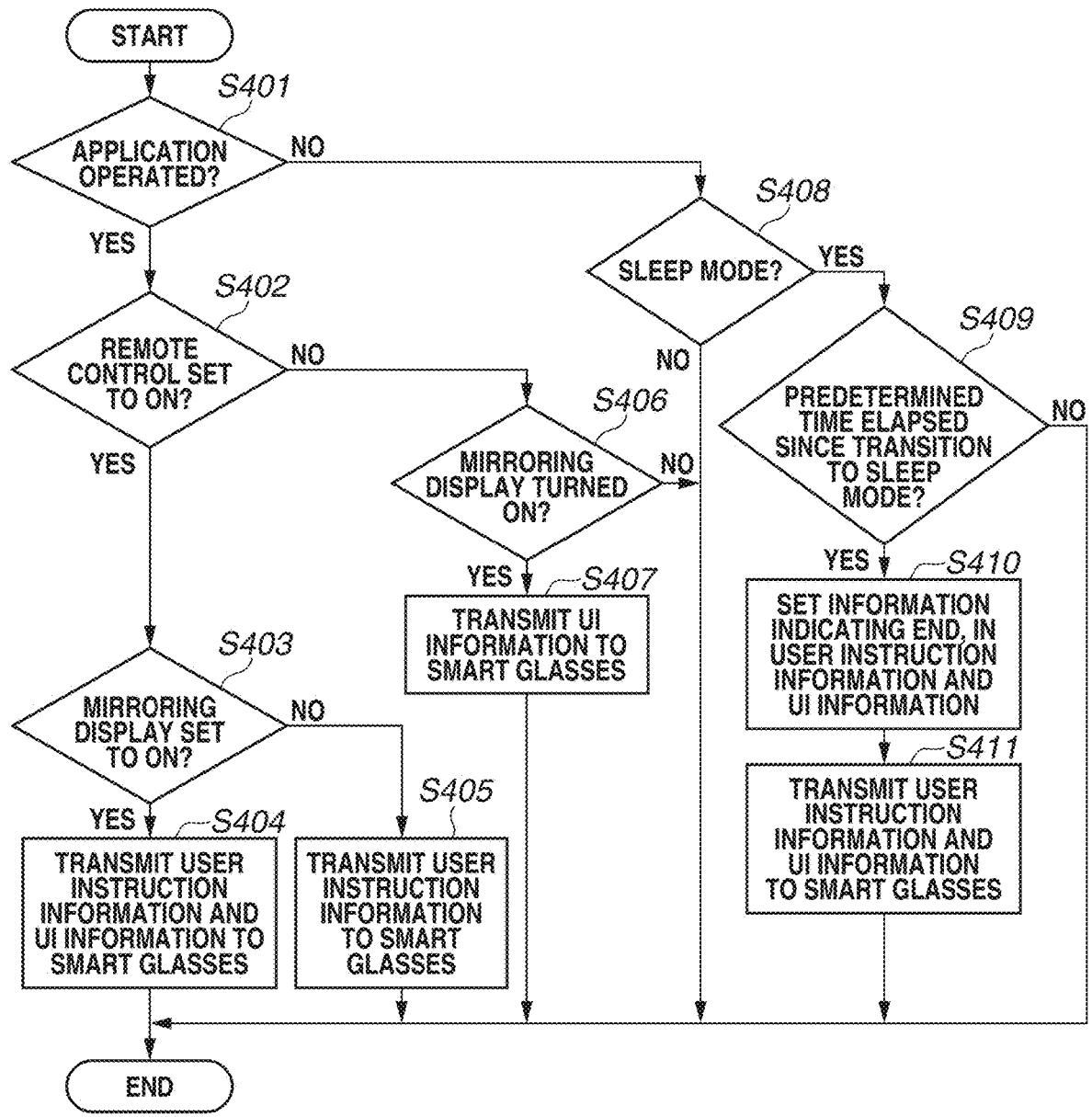

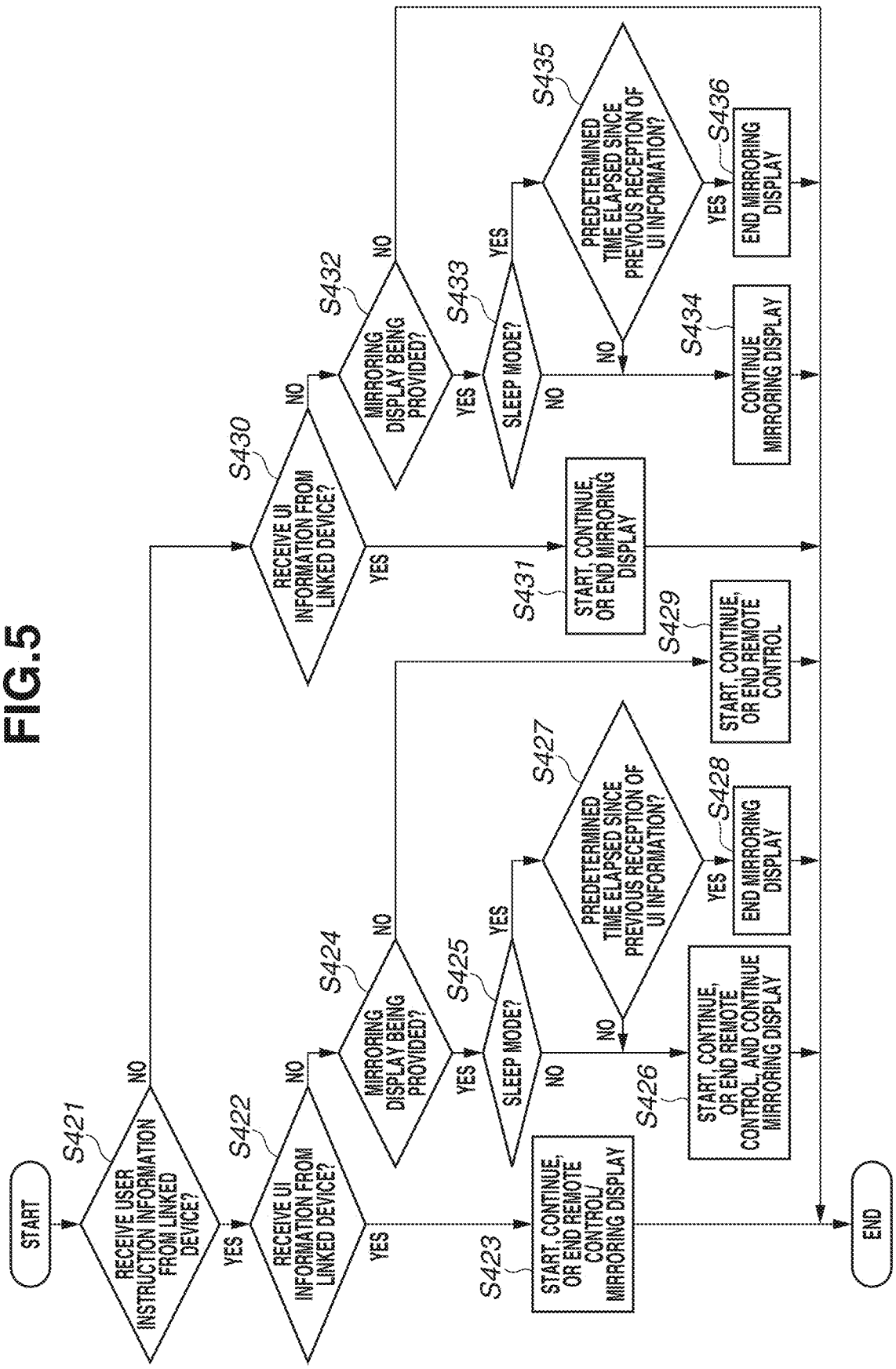

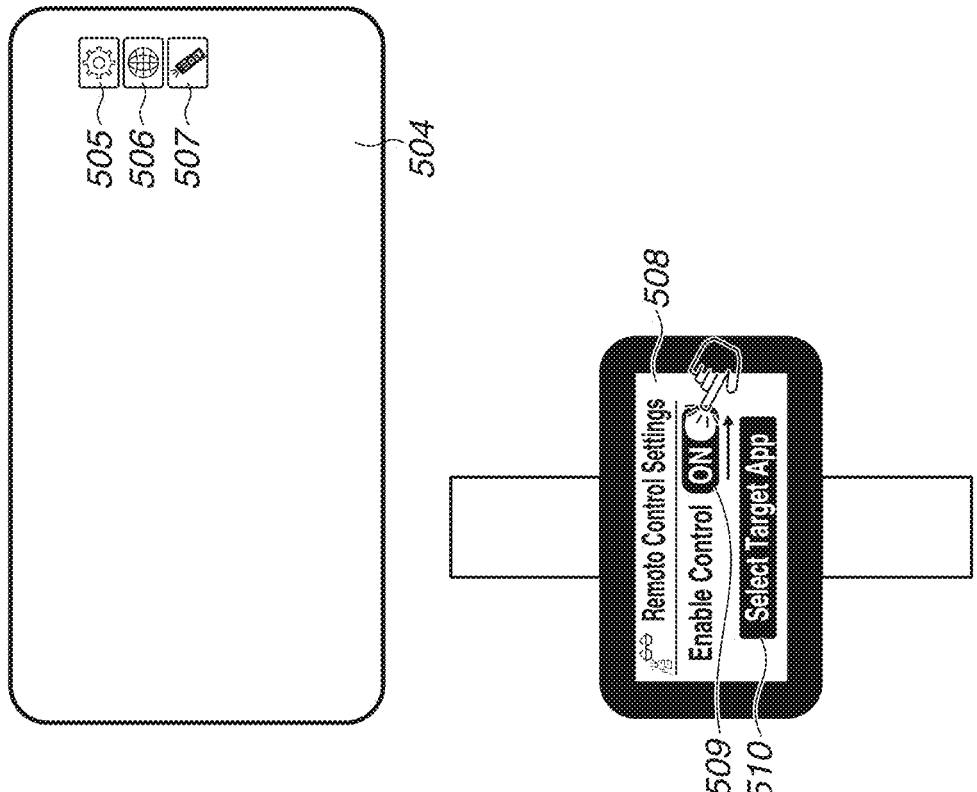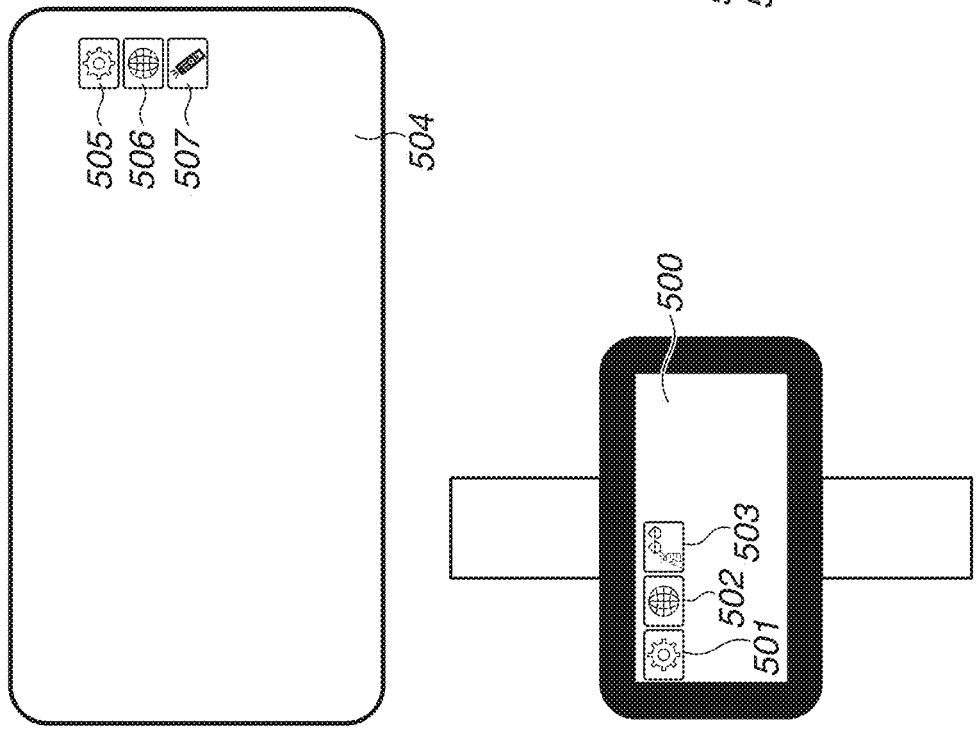

EXECUTING REMOTE CONTROL
(WEB BROWSER CONTROLLED APPLICATION SELECTED)

EXECUTING REMOTE CONTROL
(WEB BROWSER BEING CONTROLLED)

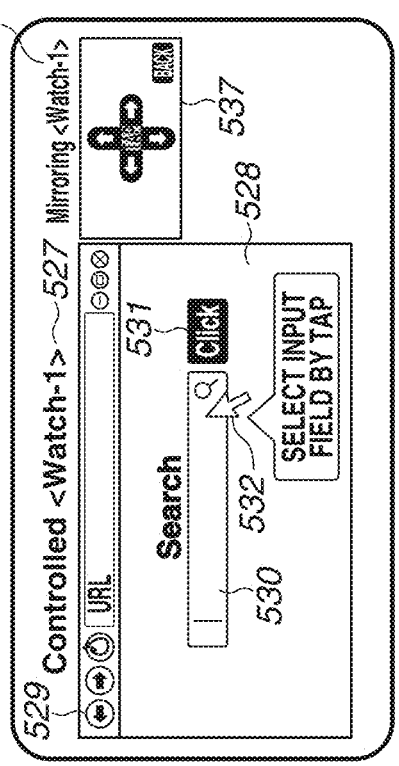
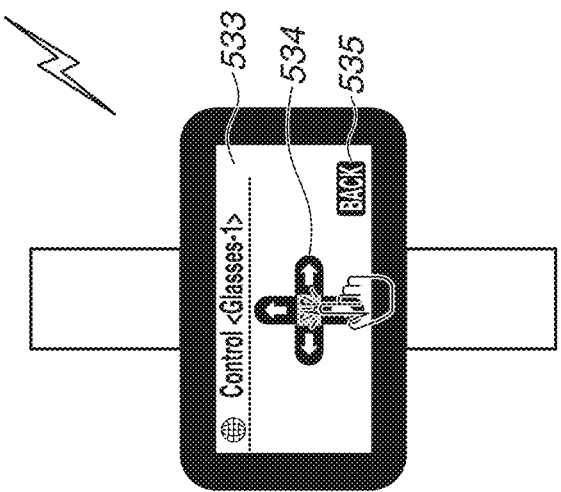
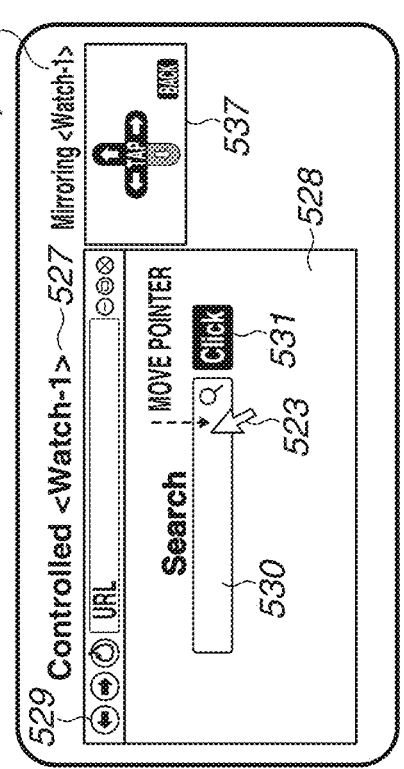

START MIRRORING DISPLAY
(KEYBOARD INPUT INSTRUCTION
CONTROL APPLICATION ACTIVATED)

PROVIDING MIRRORING DISPLAY
(CHARACTER SELECTED)

FIG.10B
EXECUTING REMOTE CONTROL
(EXECUTE SEARCH BY SELECTING CLICK BUTTON)
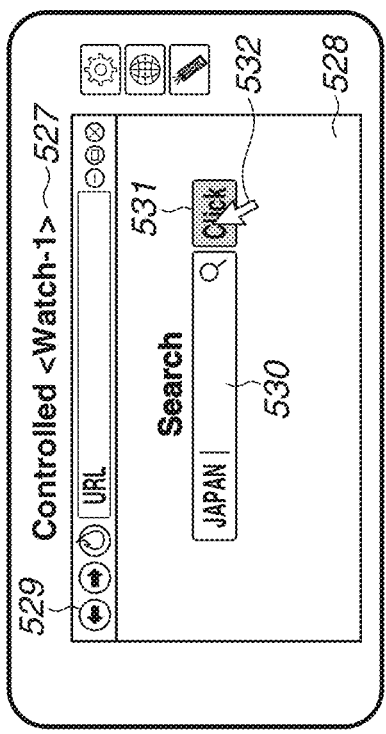
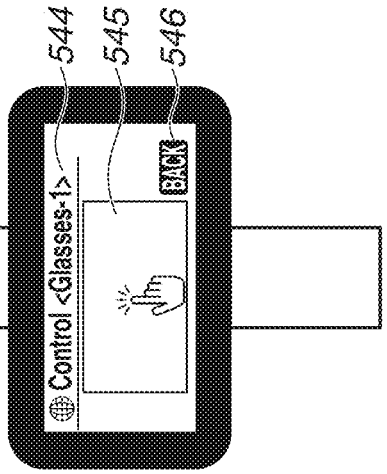
FIG.10A
EXECUTING REMOTE CONTROL
(TOUCH PAD APPLICATION ACTIVATED)
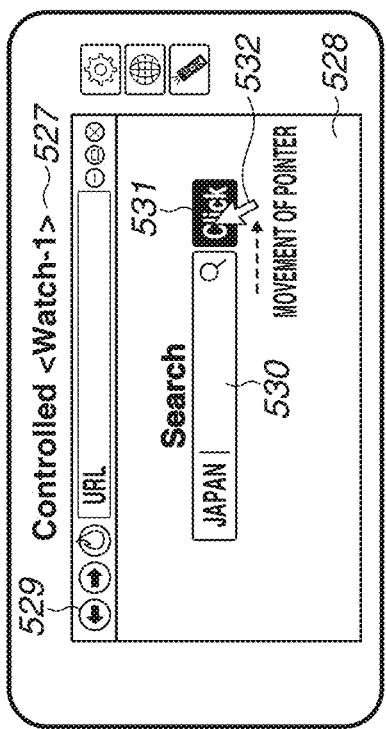
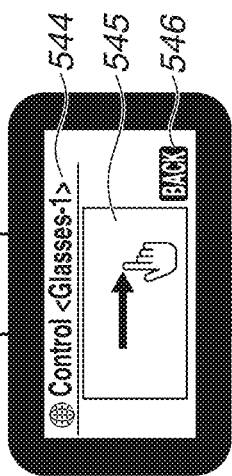

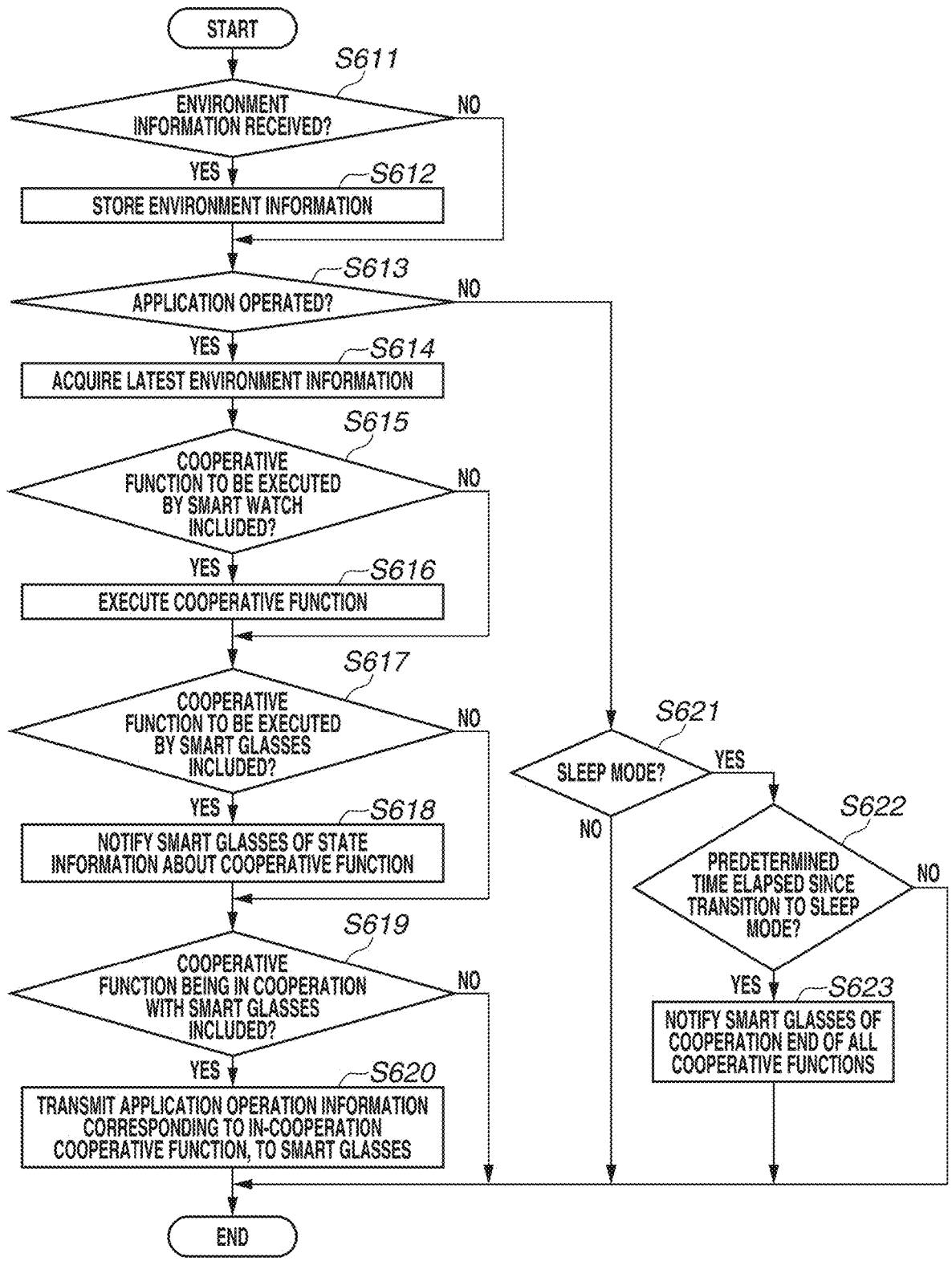

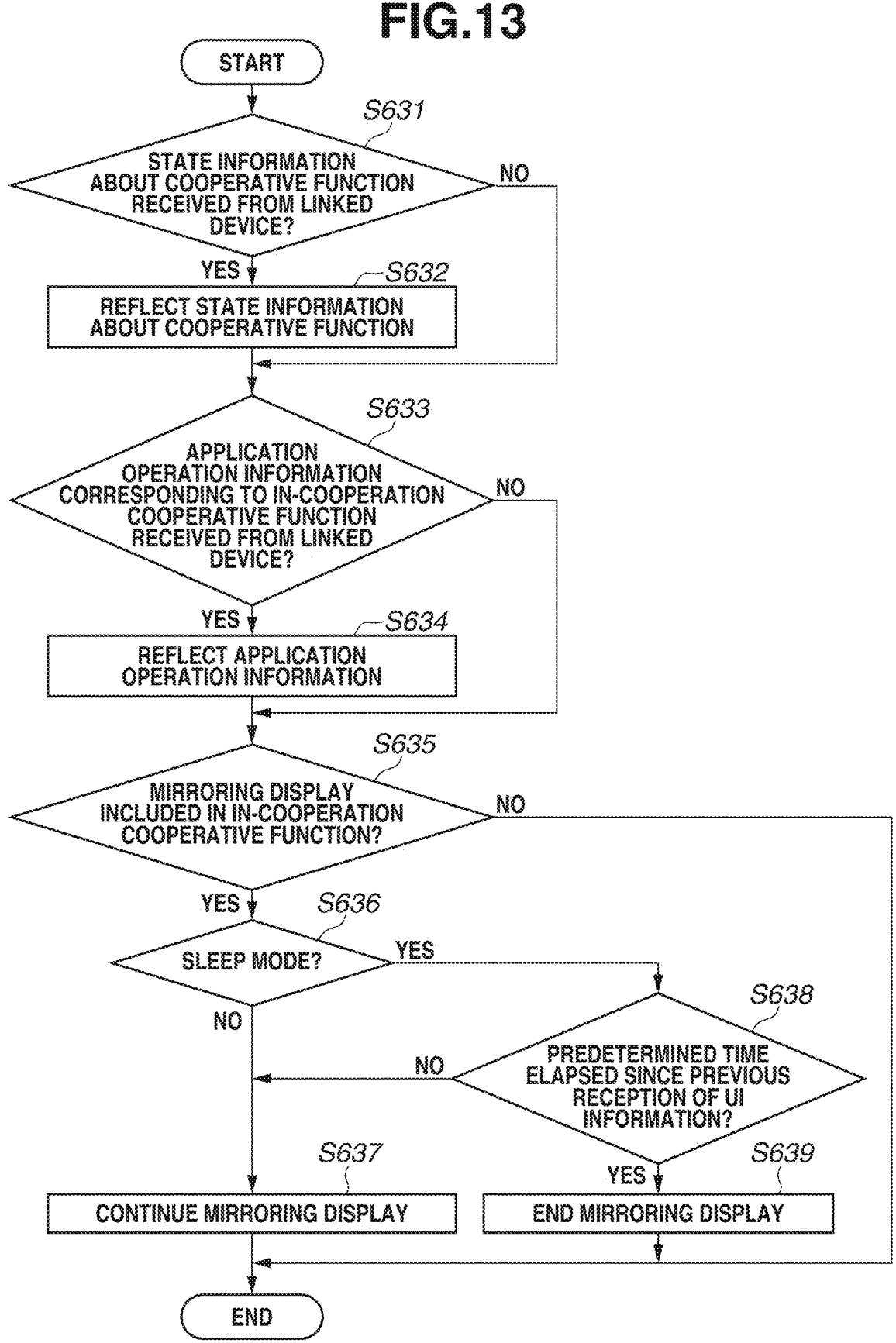

GLASSES-TYPE INFORMATION DEVICE, AND METHOD AND STORAGE MEDIUM FOR THE SAME

CROSS-REFERENCE TO RELATED APPLICATIONS

This application is a Continuation of International Patent Application No. PCT/JP2022/004993, filed Feb. 9, 2022, which claims the benefit of Japanese Patent Application No. 2021-024691, filed Feb. 18, 2021, both of which are hereby incorporated by reference herein in their entirety.

BACKGROUND OF THE INVENTION

Field of the Invention

The present invention relates to a technique relating to a glasses-type information device, such as a smart glass.

Background Art

Wearable terminals (smart glass, smart watch, smartphone, etc.) have become more diversified. Users often simultaneously wear a plurality of terminals, and technologies of linking these wearable terminals have been proposed. Among these technologies, there has been proposed a technique of displaying partial image data indicating a partial region of an image being displayed on a smartphone, on a head-mounted display (HMD), in cooperation between the smartphone and the HMD (Japanese Patent Application Laid-Open No. 2019-36914).

CITATION LIST

Patent Literature

PTL 1: Japanese Patent Laid-Open No. 2019-36914

In the days ahead, glasses-type information devices, such as smart glasses, might be routinely worn and used in replacement of smartphones. On the other hand, a wearable terminal, such as a smart watch, different from a glasses-type information device is expected to continue to be used in combination with the glasses-type information device. It is considered to become necessary in the future to enhance usability in linking these devices and remotely controlling the functionality of the glasses-type information device from the different wearable terminal.

SUMMARY OF THE INVENTION

According to an aspect of the present invention, a glasses-type information device configured to execute an application includes at least one memory storing instructions, and at least one processor executing the instructions causing the glasses-type information device to execute display control in such a manner that an image corresponding to an operation unit relating to remote control on the application is projected in a field of vision of a user wearing the glasses-type information device by using the glasses-type information device, the remote control being executed by a linked device held by the user, and execute function control of the application based on a command received from the linked device in accordance with a user operation performed by the user on the linked device.

Further features of the present invention will become apparent from the following description of exemplary embodiments with reference to the attached drawings.

BRIEF DESCRIPTION OF THE DRAWINGS

FIG. 2A is a diagram illustrating an example of a hardware configuration of smart glasses.

FIG. 2B is a diagram illustrating an example of a hardware configuration of a smart watch.

FIG. 4 is a flowchart illustrating processing to be executed by a wearable terminal that cooperates with a glasses-type information device according to a first exemplary embodiment.

FIG. 5 is a flowchart illustrating processing to be executed by a glasses-type information device that cooperates with another wearable terminal according to the first exemplary embodiment.

FIG. 6A illustrates an example of an initial screen on each device.

FIG. 6B illustrates an example of display control executed on each device at the time of remote control start.

FIG. 8A illustrates an example of first display control which is executed on each device when mirroring display is performed in remote control.

FIG. 8B illustrates an example of display control which is executed on each device when an operation performed during mirroring display is reflected.

FIG. 10A illustrates an example of first display control which is executed on each device in a case where mirroring display is not performed in remote control.

FIG. 10B illustrates an example of second display control which is executed on each device in a case where mirroring display is not performed in remote control.

FIG. 12 is a flowchart illustrating processing to be executed by the wearable terminal that cooperates with the glasses-type information device according to the second exemplary embodiment, when an environment change is detected.

FIG. 13 is a flowchart illustrating processing to be executed by the glasses-type information device that cooperates with the wearable terminal according to the second exemplary embodiment.

DESCRIPTION OF THE EMBODIMENTS

Exemplary embodiments of the present invention will be described below with reference to the drawings.

First Exemplary Embodiment

Figure 1:
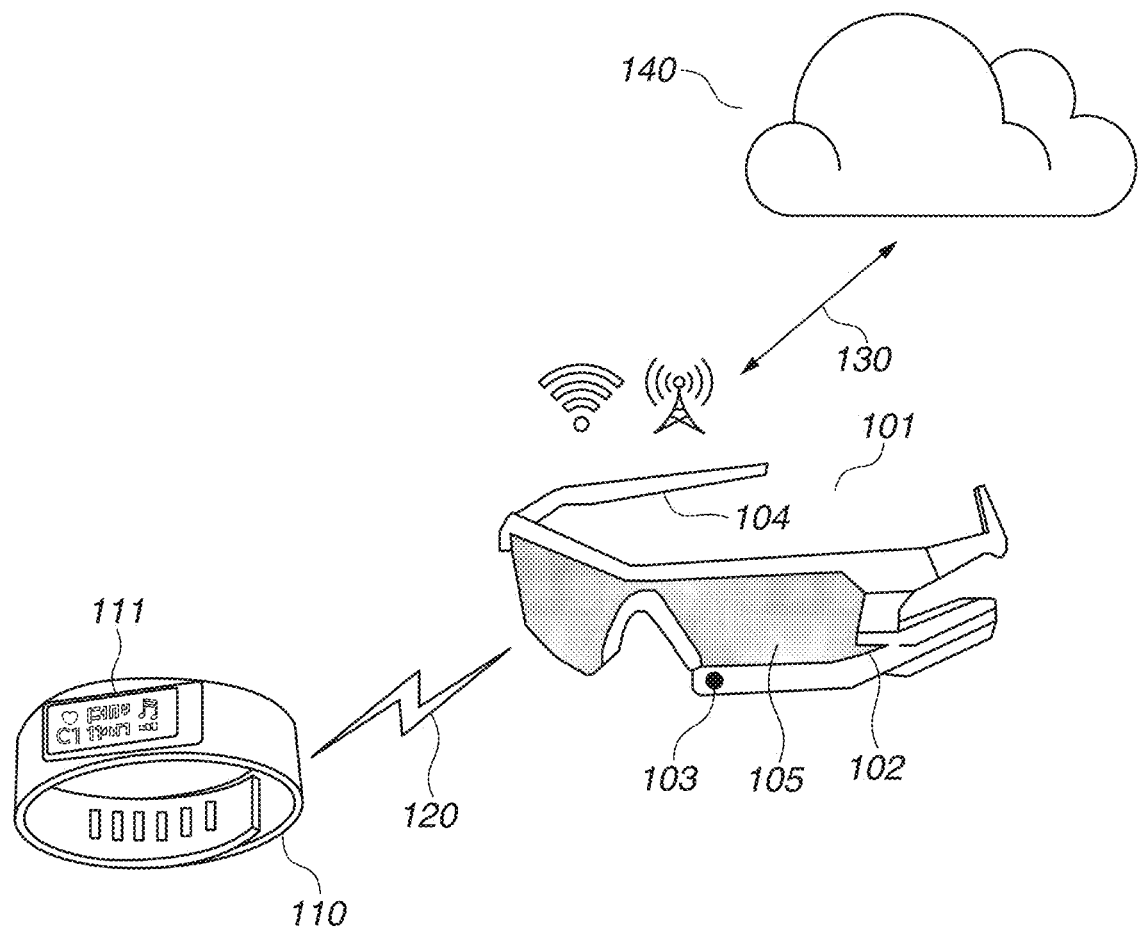
FIG. 1 is a diagram illustrating an example of a configuration of a system including a glasses-type information device and another wearable terminal.

FIG. 1 illustrates an example of a configuration of a system including a glasses-type information device and a wearable terminal that cooperates with the glasses-type information device. The glasses-type information device is able to communicate with a mobile network (mobile communication network) 130 and the Internet 140 directly or via a mobile router (not illustrated). In the present invention, smart glasses 101 are used as an example of the glasses-type information device. The glasses-type information device is not limited to binocular smart glasses, and a monocular smart glass and a head-mounted display is also applicable. The wearable terminal is an information device including a notification function such as a display function and/or a vibration function, and a communication function such as Bluetooth® communication through which communication with the glasses-type information device is enabled. In the present invention, a smart watch 110 is used as an example of the wearable terminal.

The smart glasses 101 are a wearable information terminal to be worn by a user in the vicinity of his/her eyes. The smart glasses 101 display, on a display unit 102, a video which is a virtual image, in a field of vision of the user without blocking the field of vision. Such a display method is referred to as augmented reality (AR) or mixed reality (MR), and is provided by a function of projecting information onto a transmissive display (lens 105) or a retina (not illustrated) of the user. FIG. 1 illustrates the smart glasses 101 that provide video to one eye, but in the present invention, the smart glasses 101 that project video in fields of vision of both eyes is also applicable.

The display unit 102 is also provided with a camera unit 103 for capturing an image of a subject in an eye direction of the user. An operation frame 104 serves as a frame of the smart glasses 101, includes a touch sensor, and is used for operating a terminal. The operation frame 104 has a built-in speaker function, and can transmit sound to the user.

The smart glasses 101 is capable of implementing an internally-stored module, such as an embedded Subscriber Identity Module (eSIM), and is capable of connecting to the Internet 140 via the mobile network 130 that uses a fourth Generation Mobile Communication System (4G) or fifth Generation Mobile Communication System (5G) network. The smart glasses 101 is also capable of connecting to a mobile router owned by the user, via a connection based on Wi-Fi or a universal serial bus (USB), and connecting to the mobile network 130 via the mobile router. The smart glasses 101 is also capable of connecting to the Internet 140 via Wi-Fi connection without going through the mobile network 130.

The smart watch 110 is a wristwatch-type information terminal to be worn by the user on his/her wrist. A display unit 111 not only displays information such as a time but also functions as a touch panel with which the user is enabled to operate a terminal using the display unit 111. Wireless communication 120 is used for performing data communication between the smart glasses 101 and the smart watch 110, and is assumed to be wireless communication complying with the Bluetooth® standard, but the wireless communication 120 is not limited to this. The smart watch 110 also includes a notification function based on a vibration function, aside from a display function.

FIGS. 2A and 2B are diagrams each illustrating an example of a hardware configuration of the smart glasses 101 and the smart watch 110, respectively, according to an exemplary embodiment of the present invention.

FIG. 2A is a diagram illustrating a hardware configuration of the smart glasses 101.

A central processing unit (CPU) 201 comprehensively controls various functions of the smart glasses 101 via an internal bus 206 based on programs stored in a read-only memory (ROM) 203. A result of execution of a program performed by the CPU 201 is projectable and displayable by a display 202 in a field of vision of the user as video. In the present exemplary embodiment, a method by which the user views an image projected by the display 202 in the field of vision via the transmissive lens 105 is assumed as a display method. Nevertheless, a method by which the display 202 directly projects an image onto a retina is also employable. The ROM 203 is, for example, a flash memory, and stores various types of setting information and application programs as described above. A random access memory (RAM) 204 functions as a memory or a work area of the CPU 201. The processing illustrated in a flowchart, which features the present exemplary embodiment, and will be described below with reference to the drawings, is implemented by the CPU 201 executing a corresponding program.

A network interface (I/F) 205 is a network module for connecting to the mobile network 130 and Wi-Fi network. By this module, the smart glasses 101 become connectable to the Internet 140. In a case where a mobile router is used, the smart glasses 101 can also establish connection using a USB I/F (not illustrated) of the smart glasses 101.

An operation unit 207 receives an input made by the user using the operation frame 104, and transmits a signal corresponding to the input, to the above-described processing units via an operation unit I/F 208. A sensor unit 209 schematically illustrates one or more sensors. More specifically, at least any of a global positioning system (GPS), a gyro sensor, an acceleration sensor, a proximity sensor, and a blood pressure/heart rate measurement sensor is mounted on the smart glasses 101. In addition, a sensor for detecting biological information for implementing fingerprint authentication, vein authentication, iris authentication, and/or other authentications may be mounted on the smart glasses 101. A camera 210 has an image capturing function, and image data obtained by image capturing is stored into the ROM 203. A laser 211 projects various pieces of content onto the display 202, or directly projects various pieces of content onto a retina for a retina projection method. A storage device 212 is a storage medium, and is a device storing various types of data, such as applications. The storage device 212 also includes a device for reading out data in a storage medium, and a device for deleting data in a storage medium. Some terminals include only the ROM 203, without including the storage device 212. A near field communication I/F 213 is used in communication with the smart watch 110, and realizes the wireless communication 120, for example.

While not illustrated, the smart glasses 101 is further configured to include a structure for realizing a voice call using a network or a phone line, so that the smart glasses 101 is usable in place of modern-day smartphones. More specifically, the smart glasses 101 includes a component for connecting to a phone line, a speaker, a microphone, a voice control chip, and the like.

FIG. 2B is a diagram illustrating a hardware configuration of the smart watch 110.

A CPU 221 comprehensively controls various functions of the smart watch 110 via an internal bus 226 based on programs stored in a ROM 223. A result of execution of an application program performed by the CPU 221, and a notification from the smart glasses 101, and other types of information are displayed on a display 222. The ROM 223 is a flash memory, and stores various types of setting information and application programs as described above. A RAM 224 functions as a memory or a work area of the CPU 221. The processing illustrated in a flowchart, which features the present exemplary embodiment, and will be described below with reference to the drawings, is implemented by the CPU 221 executing a corresponding program.

A near field communication I/F 225 performs control for the smart watch 110 performing one-way or two-way data communication with an external network device via the wireless communication 120. An operation unit 227 receives an input made by the user on the display unit 111, and transmits a signal corresponding to the input, to the above-described processing units via an operation unit LF 228. A configuration in which the display 222 and the operation unit 227 are integrated using a touch panel is also implementable. A sensor unit 229 schematically illustrates one or more sensors. More specifically, at least any of a GPS, a gyro sensor, an acceleration sensor, a proximity sensor, and a blood pressure/heart rate measurement sensor is mounted on the smart watch 110. In addition, a sensor for detecting biological information for implementing fingerprint authentication, vein authentication, iris authentication, or other authentications may be mounted on the smart watch 110.

As described above, the smart glasses 101 is capable of further executing software for implementing a voice call function.

Figure 3A:
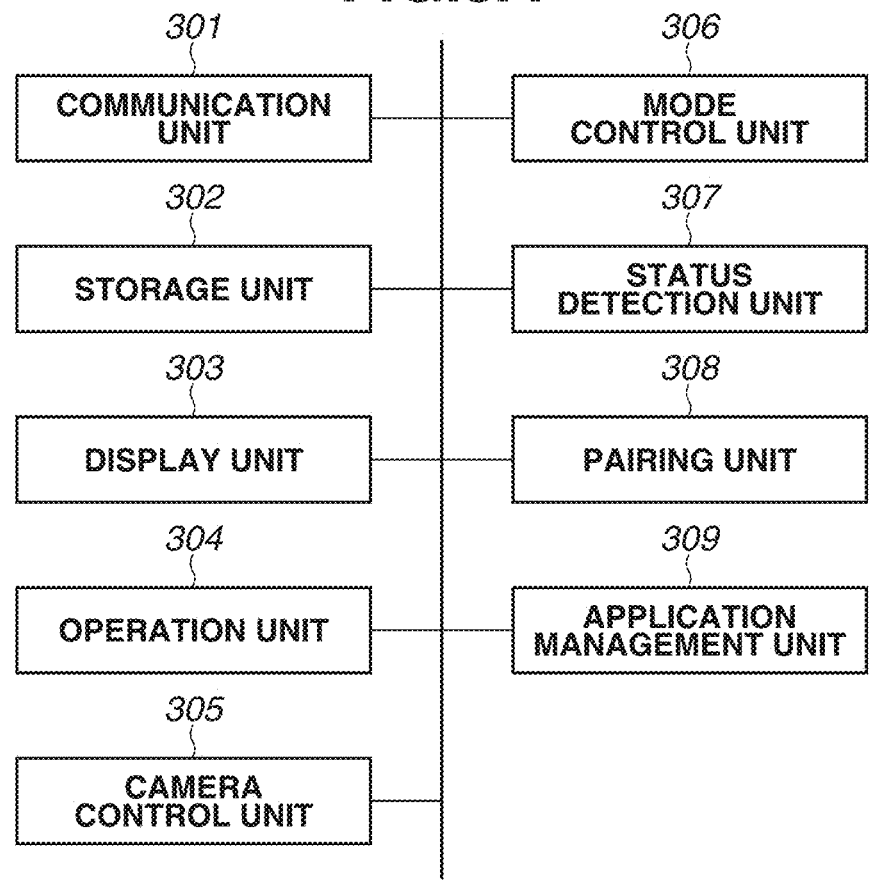
FIG. 3A is a diagram illustrating an example of a software module configuration of the smart glasses.
Figure 3B:
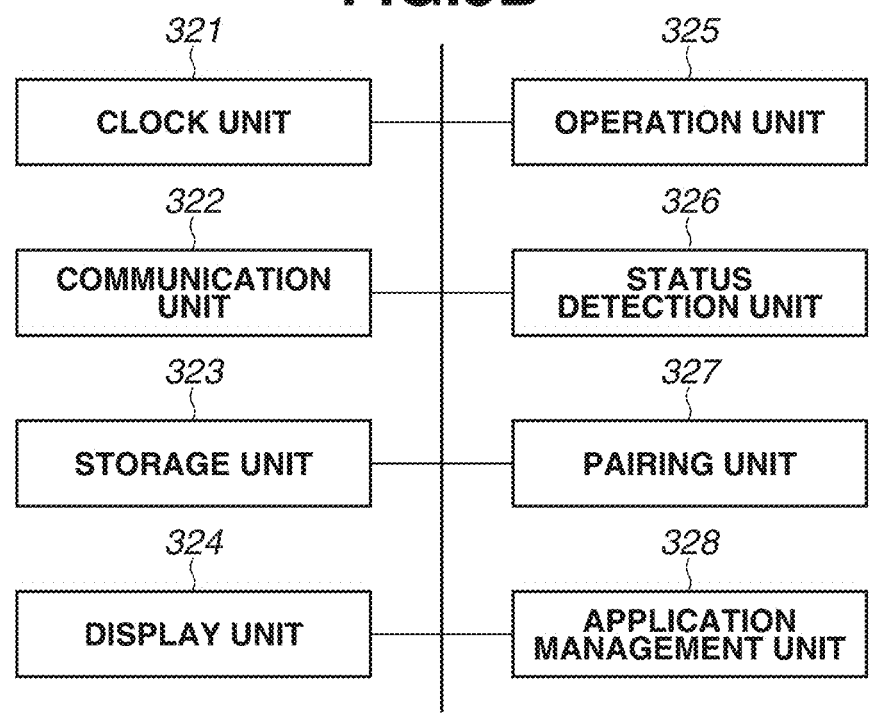
FIG. 3B is a diagram illustrating an example of a software module configuration of the smart watch.

FIGS. 3A and 3B are diagrams each illustrating an example of a software module configuration of the smart glasses 101 and the smart watch 110, respectively, according to an exemplary embodiment of the present invention.

FIG. 3A illustrates a software module configuration of the smart glasses 101.

A communication unit 301 transmits instruction information indicating an instruction to the smart watch 110, and status information about the smart glasses 101 to the smart watch 110. In addition, the communication unit 301 not only receives instruction information transmitted from the smart watch 110, but also receives a notification from an application server that cooperates with the smart glasses 101 via a network using the network I/F 205. The status information indicates whether the smart glasses 101 are currently used by the user, and indicates mode information (standby mode, power saving mode, etc.) for the smart glasses 101. A storage unit 302 performs information exchange between the ROM 203 and the RAM 204, and other processing units. The storage unit 302 also stores image data obtained through image capturing executed by the camera 210.

A display unit 303 displays results of various applications executed by the CPU 201, by, for example, AR or MR display. For example, using an AR technique, the display unit 303 displays content (projects information) onto the display 202 in such a manner that virtual content is superimposed onto a real space. In the present invention, the method of directly projecting content onto a retina is also employable. In the information projection, the position and orientation in the real space of the smart glasses 101 may be estimated based on a technique such as simultaneous localization and mapping (SLAM). An estimation result is used in display processing for virtual content.

An operation unit 304 receives an input made by the user using the operation frame 104, receives instructions for operations of various applications and operations on the display on the display 202, and performs control. A camera control unit 305 controls activation, stop, and image capturing of the camera 210, and stores image data obtained by image capturing, into the ROM 203 in cooperation with the storage unit 302. A mode control unit 306 controls mode switching between a plurality of modes provided in the smart glasses 101, and switches the state of the smart glasses 101 to a mode desired by the user. A status detection unit 307 manages information regarding a status change or a use status that has been detected by the sensor unit 209, and stores the information into the ROM 203. A pairing unit 308 controls the near field communication I/F 213 to enable two-way data communication with an external network device via the wireless communication 120.

An application management unit 309 manages execution statuses of various applications, version information about the various applications, a notification received from a server, and information indicating whether a power saving mode is on, and manages these pieces of information in the ROM 203 and the RAM 204 via the storage unit 302. In the power saving mode (including a sleep mode), control is performed such that power consumption is minimized in a case where a battery remaining amount of the smart glasses 101 is equal to a predetermined value or less.

The application management unit 309 also controls various applications based on an instruction input by the user via the operation unit 304 or an instruction received from a linked (paired) external terminal via the communication unit 301. In the present exemplary embodiment, the linked external terminal is a wearable terminal worn by the user wearing the smart glasses 101, and a specific example of the wearable terminal is the smart watch 110.

In some cases, the application management unit 309 receives either one of the instruction input by the user via the operation unit 304 and the instruction received from the external terminal via the communication unit 301 earlier, and receives the other one later. In such a case, the instruction received earlier is given a higher priority than to the one received later. Alternatively, the application management unit 309 may predetermine which instruction is to be given a higher priority uniformly or for each application. Yet alternatively, the instruction to be given a higher priority may be made settable by the user.

In a case where content is displayed onto the display 202 at the time of application control, the application management unit 309 displays content onto the display 202 via the display unit 303.

The software module configuration of the smart glasses 101 according to the present exemplary embodiment has been described above in conjunction with FIG. 3A. The smart glasses 101 may include additionally a module for a common operation unit that is capable of commonly receiving operation instructions independently of linked terminals, without individually receiving operation instructions from various linked terminals. Such operation instructions include instructions in a cooperative function, such as an instruction to operate an application on the smart glasses 101 by remote control, and a display/hide instruction for mirroring display. The definition of mirroring display will be described below.

Standardized instruction information common to the common operation unit and the linked terminals may be prepared, and the linked terminals and the smart glasses 101 may exchange instruction information. Alternatively, the common operation unit may generate or prestore an operation instruction user interface (UI) common to linked terminals, and distribute the operation instruction UI to the linked terminals, and then, each linked terminal may display the distributed operation instruction UI, receive a user operation, and notify the smart glasses 101 of received information.

FIG. 3B illustrates a software module configuration of the smart watch 110.

A clock unit 321 manages and controls time information to be displayed on the display 222. The management and control of time information may be executed by an application program stored in the ROM 223. A communication unit 322 transmits instruction information to the smart glasses 101, and receives not only status information for the smart glasses 101 but also a notification from an application server. A storage unit 323 performs information exchange between the ROM 223 and the RAM 224, and other processing units. A display unit 324 displays time information managed by the clock unit 321, and results of various applications executed by the CPU 221. The display unit 324 also displays an application notification transferred from the smart glasses 101. An operation unit 325 receives an input made by the user on the display unit 111, and controls operations of various applications and display onto the display 222. A status detection unit 326 manages, as information, change in a status detected by the sensor unit 229, and stores the information into the ROM 223. A pairing unit 327 controls the near field communication I/F 225 to enable two-way data communication with an external network device via the wireless communication 120.

An application management unit 328 manages execution statuses of various applications, version information about the various applications, a notification received from a server, and information indicating whether the state of the smart watch 110 is a sleep mode, and manages these pieces of information in the ROM 223 and the RAM 224 via the storage unit 323. The smart watch 110 transitions to the sleep mode in a case where an operation on the smart watch 110 via the operation unit 325 is not performed for a predetermined time or more. In the sleep mode, screen off and screen lock of the display 222 are performed.

The application management unit 328 also controls various applications based on an input made by the user via the operation unit 325. In a case where content is displayed onto the display 222 when the application management unit 328 controls an application, the application management unit 328 displays content onto the display 222 via the display unit 324.

The application management unit 328 further manages application-to-application glasses cooperation information for predetermining functions to be enabled when various applications on the smart watch 110 and the smart glasses 101 operate in cooperation, in the ROM 223 and the RAM 224.

The cooperation here is assumed to be remote control of an application on the smart glasses 101 that is to be executed by the smart watch 110. At the time of remote control, as a part of an image projected in a field of vision of the user that is provided by the smart glasses 101, simplified display of an operation board corresponding to the smart watch 110 is provided. In the present exemplary embodiment, the simplified display of an operation board corresponding to a wearable terminal, such as the smart watch 110, that is to be used in remote control is also called mirroring display.

The application-based glasses cooperation information predetermines, for each application, ON/OFF indicating whether to enable a remote control function, and ON/OFF indicating whether to enable a mirroring display function (refer to Table 1).

TABLE 1

Application-based glasses cooperation information

| Application ID | Application Name | Remote Control | Mirroring Display |
|---|---|---|---|
| 0001 | Application0001 | ON | ON |
| 0002 | Application0002 | ON | ON |
| 0003 | Application0003 | OFF | OFF |

A setting value of the ON/OFF indicating whether to enable mirroring display may be included in install information for various applications on the smart watch 110, or may be made settable by the user using a setting application (not illustrated) that is managed by the application management unit 328.

On the premise of the software module configurations of the smart glasses 101 and the smart watch 110, which have been described above in conjunction with FIGS. 3A and 3B, a cooperative function of the smart glasses 101 and the smart watch 110, which is a characterizing feature of the exemplary embodiment, will be described. The following description is premised on an operation to be executed for an application for which both remote control and mirroring display are set to ON in the above-described application-based glasses cooperation information (Table 1).

The smart glasses 101 of the present exemplary embodiment has the remote control function of receiving user instruction information for controlling an application on the smart glasses 101, from a linked device (the smart watch 110 in the present exemplary embodiment), and executing processing in such a manner that the application provides a function based on the user instruction information. The smart glasses 101 further receive, as user instruction information, an input made by the user via the operation unit 325 on the smart watch 110, to directly control a control target application on the smart glasses 101. These pieces of user instruction information sometimes include an application ID of an application on the smart glasses 101 that indicates a control target application.

In addition, the smart glasses 101 has a function of an operating system (OS) for issuing a control instruction to a control target application on the smart glasses 101, and/or a dedicated control application. This functionality of the OS or the dedicated control application enables data corresponding to entered user instruction information to be delivered to the control target application, so that the control target application is controlled as instructed by the user. Examples of the control application include an application corresponding to respective applications of the smart glasses 101, and an application that is used in common and is specialized in a dedicated function, such as an application dedicated for character input or an application dedicated for screen scroll. In addition, for example, when the control application ends, user instruction information to be transmitted to the smart glasses 101 is capable of include information indicating a control end of a target application. In a case where the application management unit 328 detects that a predetermined time has elapsed since the state of the smart watch 110 transitions to the sleep mode, information indicating the end of a control on a target application may be included as user instruction information.

The smart glasses 101 has the mirroring display function of receiving UI information for a linked device (the smart watch 110) to be operated at the time of remote control, and projecting an AR operation unit that is based on the UI information, onto the display 202. The remote control function and the mirroring display function of the smart glasses 101 may serve as a management function of the application management unit 309, or may serve as one of various applications to be managed by the application management unit 309.

At this time, while content of a control target application to be controlled with the remote control function is being projected and displayed on the smart glasses 101, the above-described AR operation unit (mirroring display) that is based on UI information for controlling the control target application is provided in the field of vision of the user with the mirroring display function.

In providing mirroring display, the smart glasses 101 according to the present exemplary embodiment also implements automatic control of creating a free space by slightly reducing a content image of a control target application, and providing an AR operation unit that is based on UI information, in the free space. Nevertheless, depending on the situation, it is also possible to implement the mirroring display by displaying a part or all of an image corresponding to the AR operation unit, with being superimposed on the displayed content image of the control target application. For example, in a case where the control target application operates in the background, mirroring display may be provided in a full-screen mode.

The UI information to be used in mirroring display includes screen information to be used for projection of an operation unit in the smart watch 110. The screen information may be one obtained by copying the appearance of the linked device (the smart watch 110). Alternatively, the screen information may be data such as a still image or a moving image, or may be JavaScript Object Notation (JSON) or Extensible Markup Language (XML) format structured data that enables the smart glasses 101 to generate image information.

In some cases, a linked device (the smart watch 110) includes hardware (button or mouse ball) (not illustrated) that is usable in remote control. In such cases, data having been input using the hardware is delivered to the smart glasses 101 as user instruction information. At this time, UI information includes drawing data corresponding to the hardware.

Screen information regarding a screen on the smart watch 110 in mirroring display that is executed under the remote control includes screen information regarding a control screen such as a "character input screen" and/or a "scroll screen" which serve(s) as control information input used for an input to a control target application on the smart glasses 101. When an application is ended during the mirroring display, the UI information to be transmitted to the smart glasses 101 includes information indicating a mirroring display end. Moreover, when the application management unit 328 detects a lapse of a predetermined time from a transition of the smart watch 110 into the sleep mode, UI information may include information indicating a mirroring display end.

Furthermore, it is also possible for the user to designate, with respect to the smart glasses 101, approval or disapproval of the remote control from a linked device (the smart watch 110) and/or mirroring display of the linked device. Such designation is performable by selecting a paired device. Alternatively, prompting the user to freely designate various conditions, such as an ID for identifying a device to be linked, a product type, an OS installed on a product, an OS version, an application type, and an application version, enables the smart glasses 101 to automatically determine approval or disapproval for the remote control from a linked device satisfying the conditions, and/or mirroring display of the linked device. In the present exemplary embodiment, the description will be provided of a case where the smart glasses 101 uniformly approve the remote control and the mirroring display irrespective of information regarding the smart watch 110.

FIGS. 4 and 5 are flowcharts illustrating processing, which features the present exemplary embodiment, in cooperation between the smart watch 110 and the smart glasses 101 that are in a paired state. Processing in which the smart watch 110 controls an application installed on the smart glasses 101 will be described. In FIGS. 4 and 5, it is assumed that the smart watch 110 and the smart glasses 101 have been subjected to pairing operation using the pairing unit 327 and the pairing unit 308, respectively.

FIG. 4 is a flowchart illustrating processing to be executed by the smart watch 110. Referring to this flowchart, a description will be provided of processing of transmitting information for remote control and/or mirroring display to the smart glasses 101 when the user operates an application on the smart watch 110. The application management unit 328 executes the operation of each step included in this flowchart.

In step S401, the application management unit 328 detect operation information about an operation on an application on the smart watch 110, in response to a notification of an input made by the user via the operation unit 325 and/or an instruction information regarding an instruction issued from the smart glasses 101 via the communication unit 301. Here, the operation information to be detected includes information regarding an application operation start, an application-operating state, or an application operation end. If the application management unit 328 detects an operation information about an operation on an apparatus (YES in step S401), the processing proceeds to step S402. In step S402, the application management unit 328 starts the control of an application for which a control instruction has been issued, and checks whether a preset value of ON/OFF of the remote control for the application is set to ON in the application-based glasses cooperation information (Table 1). In a case where a preset value of ON/OFF of the remote control is set to ON (YES in step S402), the processing proceeds to step S403. In step S403, the application management unit 328 further checks whether a preset value of ON/OFF of mirroring display for this application is set to ON in the application-based glasses cooperation information (Table 1). In a case where it is determined in step S403 that a preset value of ON/OFF of mirroring display is set to ON (YES in step S403), the processing proceeds to step S404. In step S404, user instruction information and UI information are transmitted to the smart glasses 101 via the communication unit 322.

In a case where it is determined in step S403 that a preset value of ON/OFF of mirroring display is set to OFF (NO in step S403), the processing proceeds to step S405. In step S405, only user instruction information is transmitted to the smart glasses 101 via the communication unit 322.

In a case where it is determined in step S402 that a preset value of ON/OFF of the remote control is set to OFF (NO in step S402), the processing proceeds to step S406. In step S406, the application management unit 328 similarly checks whether a preset value of ON/OFF of the mirroring display for the application is set to ON in the application-based glasses cooperation information (Table 1). In a case where it is determined in step S406 that a preset value of ON/OFF of mirroring display is set to ON (YES in step S406), the processing proceeds to step S407. In step S407, only the UI information is transmitted to the smart glasses 101 via the communication unit 322. In a case where it is determined in step S406 that a preset value of ON/OFF of mirroring display is set to OFF (NO in step S406), the processing of the flowchart illustrated in FIG. 4 is ended.

In a case where no operation information regarding an operation on an application is detected in step S401 (NO in step S401), the processing proceeds to step S408. In step S408, the application management unit 328 determines whether the smart watch 110 is in the sleep mode. The following determination as to whether the smart watch 110 is in the sleep mode may be replaced with determination as to whether the smart watch 110 is in a desired power saving mode to which the state of the smart watch 110 can transition. In a case where it is determined in step S408 that the smart watch 110 is not in the sleep mode (NO in step S408), the processing of the flowchart illustrated in FIG. 4 is ended.

In a case where it is determined in step S408 that the smart watch 110 is in the sleep mode (YES in step S408), the processing proceeds to step S409. In step S409, the application management unit 328 further determines whether a predetermined time has elapsed since the transition to the sleep mode. In a case where it is determined in step S409 that the predetermined time has not elapsed (NO in step S409), the processing of the flowchart illustrated in FIG. 4 is ended. In a case where it is determined in step S409 that the predetermined time has elapsed (YES in step S409), the processing proceeds to step S410. In step S410, information indicating a control end of the remote control is set in the user instruction information, and information indicating a display end of the mirroring display is set in the UI information. In step S411, the user instruction information and the UI information are then transmitted to the smart glasses 101.

FIG. 5 is a flowchart illustrating processing, which is to be executed by the smart glasses 101, of receiving control information about the remote control or the mirroring display from the smart watch 110 and executing control based on the control information. The application management unit 309 executes the operation in the steps included in this flowchart.

If data is received from a linked device via the communication unit 301, in step S421, the application management unit 309 checks whether the received data includes the user instruction information. In a case where the received data includes the user instruction information (YES in step S421), the processing proceeds to step S422. In step S422, the application management unit 309 further checks whether the received data includes the UI information. In a case where the received data includes the UI information (YES in step S422), the processing proceeds to step S423. In step S423, the application management unit 309 starts, continues, or ends the remote control of an application on the smart glasses 101 based on the user instruction information, and further starts, continues, or ends the mirroring display based on the UI information.

In a case where it is determined in step S422 that the received data does not include the UI information (NO in step S422), the processing proceeds to step S424. In step S424, the application management unit 309 checks whether the mirroring display is being provided, based on an execution status of an application which is being managed. In a case where it is determined in step S424 that the mirroring display is being provided (YES in step S424), the processing proceeds to step S425. In step S425, the application management unit 309 determines whether the smart glasses 101 are in the sleep mode. The following determination as to whether the smart glasses 101 are in the sleep mode may be replaced with determination as to whether the smart glasses 101 are in a desired power saving mode to which the state of the smart glasses 101 can transition.

In a case where it is determined in step S425 that the smart glasses 101 are not in the sleep mode (NO in step S425), the processing proceeds to step S426. In step S426, the application management unit 309 starts, continues, or ends the remote control based on the user instruction information, and continues the mirroring display. In a case where it is determined in step S425 that the smart glasses 101 are in the sleep mode (YES in step S425), the processing proceeds to step S427. In step S427, the application management unit 309 further determines whether a predetermined time has elapsed since previous reception of the UI information from the linked device (the smart watch 110). In a case where the predetermined time has elapsed (YES in step S427), the processing proceeds to step S428. In step S428, the application management unit 309 ends the mirroring display. In a case where the predetermined time has not elapsed (NO in step S427), the processing proceeds to step S426. In a case where it is determined in step S424 that the mirroring display is not being provided (NO in step S424), the processing proceeds to step S429. In step S429, the application management unit 309 starts, continues, or ends only the remote control based on the user instruction information.

In a case where it is determined in step S421 that the received data from the linked device does not include user instruction information (NO in step S421), the processing proceeds to step S430. In step S430, the application management unit 309 checks whether the received data includes the UI information, as in step S422. In a case where the received data includes the UI information (YES in step S430), the processing proceeds to step S431. In step S431, the application management unit 309 starts, continues, or ends only the mirroring display based on the UI information.

In a case where it is determined in step S430 that the received data does not include the UI information (NO in step S430), the processing proceeds to step S432. In step S432, the application management unit 309 checks whether the mirroring display is being provided, as in step S424. In a case where it is determined in step S432 that the mirroring display is being provided (YES in step S432), the processing proceeds to step S433. In step S433, the application management unit 309 determines whether the smart glasses 101 are in the sleep mode. In a case where it is determined in step S433 that the smart glasses 101 are not in the sleep mode (NO in step S433), the processing proceeds to step S434. In step S434, the application management unit 309 continues mirroring display.

In a case where it is determined in step S433 that the smart glasses 101 are in the sleep mode (YES in step S433), the processing proceeds to step S435. In step S435, the application management unit 30) further determines whether a predetermined time has elapsed since the previous reception of the UI information from the linked device (the smart watch 110). In a case where the application management unit 309 determines that the predetermined time has elapsed (YES in step S435), the processing proceeds to step S436. In step S436, the application management unit 309 ends the mirroring display. In a case where the application management unit 309 determines that the predetermined time has not elapsed (NO in step S435), the processing proceeds to step S434. In a case where the application management unit 309 determines in step S432 that the mirroring display is not being provided (NO in step S432), the processing of the flowchart illustrated in FIG. 5 is ended.

FIGS. 6A to 10C each illustrate display examples on the display 222 of the smart watch 110 and the display 202 of the smart glasses 101 that are provided when a cooperative function of the remote control and/or the mirroring display is executed. FIGS. 6A to 10C sequentially illustrate a series of UI operations including an AR display that are premised on a use case where the user starts the remote control of the smart glasses 101 from the smart watch 110, and executes a web search using a web browser application on the smart glasses 101.

FIG. 6A illustrates an initial screen 500 of the smart watch 110 and an initial screen 504 of the smart glasses 101. Application (icons) 501, 502, and 503 on the smart watch 110 are a smart watch setting application, a web browser application, and a remote control application for controlling an application on the smart glasses 101, respectively.

The display of application icons 505, 506, and 507 are implemented by being projected into a field of vision of the user through an AR technique of an application executed by the smart glasses 101. The application icons 505, 506, and 507 are icons for an application for making settings of the smart glasses 101, a web browser application, and a remote controller application having a home electronics remote controller function, respectively. Application icons other than the above-described application icons displayed on the initial screens 500 and 504 can also be similarly displayable as an application icon. In a case where the smart glasses 101 recognize a finger of the user, and detect a selection operation of an icon provided through the AR technique, a selected application is activated, and content of the application is further displayed in the field of vision of the user. Remote control to be executed by the smart watch 110 will be described below. The remote control is performable in combination with an operation to be executed in response to the recognition of an input made by the user on the smart glasses 101.

If the user presses the remote control application (icon) 503 on the initial screen 500 illustrated in FIG. 6A, a remote control setting screen 508 illustrated in FIG. 6B is displayed. The remote control setting screen 508 includes a control enabling button 509 for enabling and starting the remote control, and a control target application selection button 510 for transition to a control target application selection screen to be displayed when an application on the smart glasses 101 is controlled. The control enabling button 509 is set to OFF in an initial state. By pressing the control enabling button 509 as illustrated in FIG. 6B, a toggle button of ON/OFF is slid and the control enabling button 509 is switched to control ON.

Figure 6C:
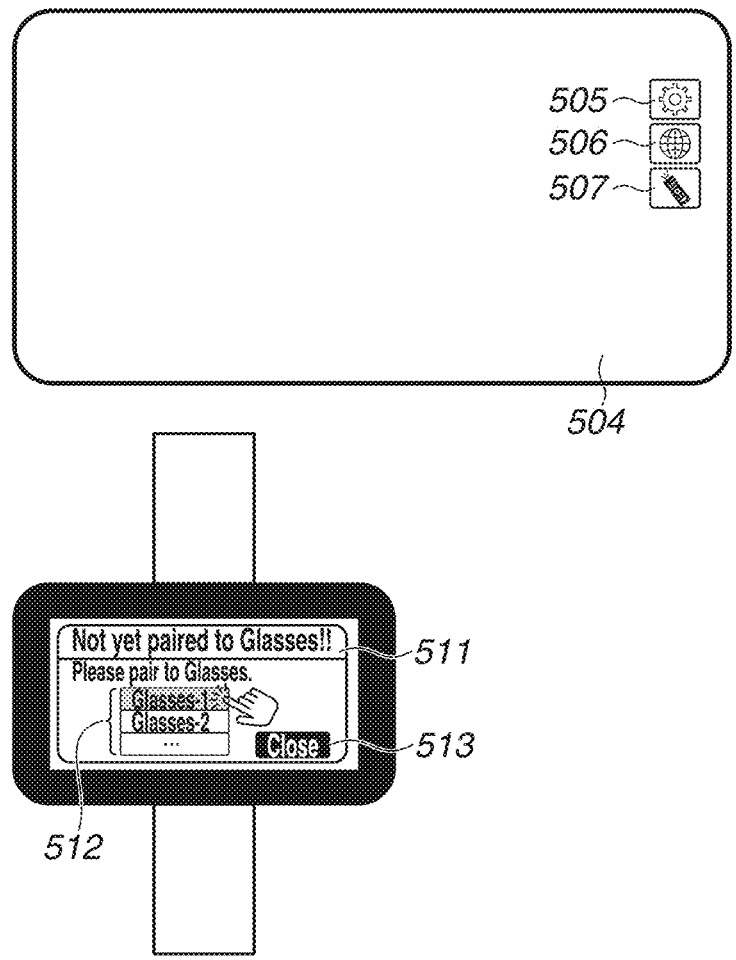
FIG. 6C illustrates an example of display control regarding pairing which is executed at the time of remote control start.

When the control enabling button 509 is switched to control ON, in a case where pairing of the smart watch 110 and the smart glasses 101 has not been executed, a popup screen 511 for inexecution of the pairing is displayed as illustrated in FIG. 6C. In the popup screen 511 for inexecution of the pairing, a warning message indicating that pairing has not been executed yet and a candidate list 512 of target smart glasses 101 to which the smart watch 110 is able to be paired is displayed. In the case example of the popup screen 511 for inexecution of the pairing, the candidate list 512 indicates that pairing to the smart glasses 101 named "Glasses-1" and "Glasses-2" is executable over near field communication. If the user selects "Glasses-1", an authentication screen (not illustrated) for pairing is displayed, and the user inputs an authentication ID and/or an authentication password, so that authentication execution and pairing execution are completed. To close the popup screen 511 for inexecution of the pairing, a close button 513 is pressed.

In a case where pairing has been executed when the control is set to ON using the control enabling button 509 as illustrated in FIG. 6B, or in a case where pairing execution has been completed based on the popup screen 511 for inexecution of the pairing illustrated in FIG. 6C, the remote control is started.

Figures 7A, 7B:
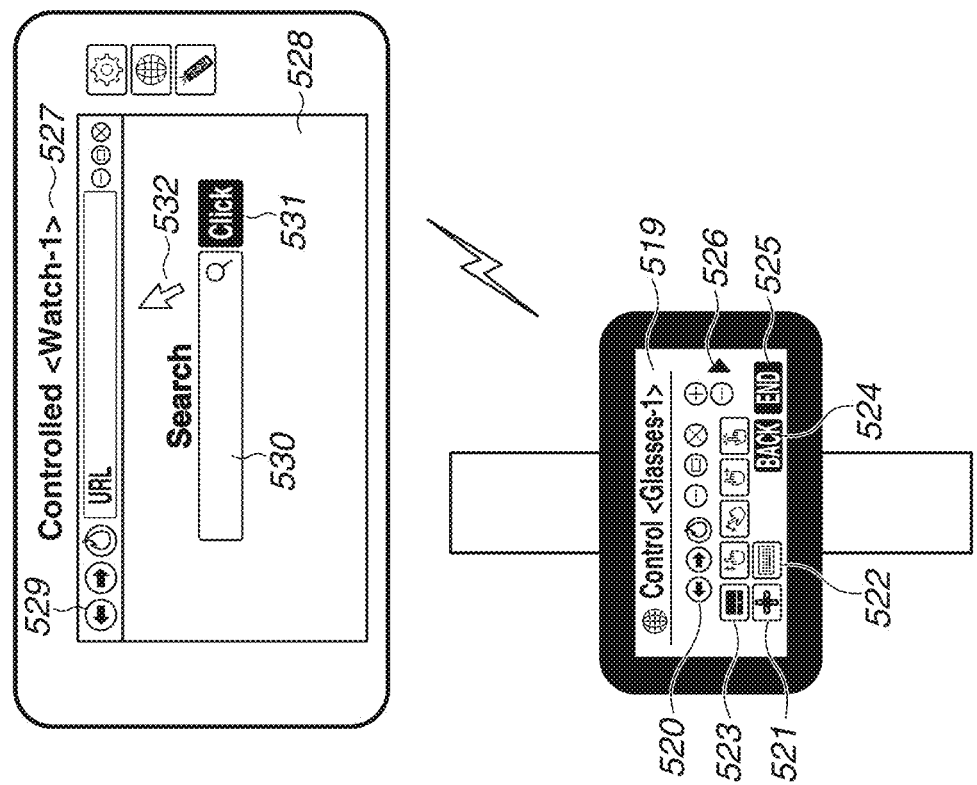
FIG. 7A illustrates an example of display control which is executed on each device at the time of control application selection for remote control.
FIG. 7B illustrates an example of display control which is executed on each device during remote control.

FIG. 7A illustrates a UI display state in which a control target application selection screen 514 for controlling an application on the smart glasses 101 that is to be controlled is displayed in a remotely-controlling state. The screen transitions to this state by the user pressing the above-described control target application selection button 510 illustrated in FIG. 6B. A setting control application (icon) 515, a web browser control application (icon) 516, and a remote controller control application (icon) 517 that are displayed on the control target application selection screen 514 are icons used for respectively controlling applications on the smart glasses 101.

If a selection operation of the web browser control application 516 that is performed by the user on the smart watch 110 is detected, a web browser control screen 519 illustrated in FIG. 7B is displayed on the smart watch 110. In addition, a web browser screen 528 which is a screen displayed after the activation of the web browser application 506 to be controlled, and a control display 527 that is displayed during the control and indicates that the remote control is being executed are displayed on the smart glasses 101. As described above, the display on the smart glasses 101 is a projection display in the field of vision of the user through the AR technique.

In the display 527 which is displayed during the control, a name of a linked terminal that instructs the remote control is displayed in such a manner that a linked terminal controlling the smart glasses 101 is recognizable. In this example, that the smart glasses 101 are being controlled by the smart watch 110 named "Watch-1" is displayed. The web browser screen 528 is a search screen. The web browser screen 528 includes a return button 529 for returning to a screen displayed before search, after search is executed on the search screen, an input field 530 for entering a search word, and a click button 531 for executing a search based on a word entered into the input field 530. The web browser screen 528 further includes a pointer 532 for designating a region on the web browser screen 528 while moving on the web browser screen 528, a browser update button, a button indicating a minimized or maximized display of the browser, a button for closing a browser, and a URL display field.

A return button 520 on the web browser control screen 519 on the smart watch 110 corresponds to the above-described return button 529, and is an instruction button for pressing the return button 529. In addition, a BACK button 524 on the web browser control screen 519 is a button for ending the web browser control application, and returning to the control target application selection screen 514, which is a previous screen. If the user presses an END button 525, the web browser control application 516 and the remote control application 503 are ended, the web browser control screen 519 is closed, and the initial screen 500 is displayed.

The web browser control screen 519 is an instruction screen for issuing a control instruction of the web browser application 506 on the smart glasses 101, but the web browser control screen 519 further includes application icons for instruction control applications each having a function of issuing a specific operation instruction.

Examples of instruction control applications include a pointer movement instruction control application 521, a keyboard input instruction control application 522, and a touch pad instruction control application 523. With the pointer movement instruction control application 521, an instruction to move the pointer 532 in a direction indicated by an arrow key is issued. With the keyboard input instruction control application 522, a character input instruction is issued. With the touch pad instruction control application 523, an instruction equivalent to that with a touch pad function included in an existing laptop personal computer (PC) is issuable. In addition, the control instruction applications also include a scroll application for issuing a scroll instruction, a pinch-in/out application for issuing a pinch-in/out instruction, a flick application for sliding a screen upward, downward, leftward, or rightward by a flick, and a tap application specialized in a tap instruction.

Regarding the applications on the smart watch 110, which have been described in conjunction with FIGS. 6A to 6C, 7A, and 7B, Table 2 specifically indicates application-based glasses cooperation information in Table 1 described above.

TABLE 2

Application-Based Glasses Cooperation Information

| Application ID | Application Name | Remote Control | Mirroring Display |
|---|---|---|---|
| 0004 | Remote Control 503 | ON | OFF |
| 0005 | Setting Control 515 | ON | OFF |
| 0006 | Web Browser Control 516 | ON | OFF |
| 0007 | Remote Controller Control 517 | ON | ON |
| 0008 | Pointer Movement Instruction Control 521 | ON | ON |
| 0009 | Keyboard Input Instruction Control 522 | ON | ON |
| 0010 | Touch Pad Instruction Control 523 | ON | OFF |

The start of the above-described remote control illustrated in FIGS. 6A to 6C is executed based on the remote control ON/OFF setting for the remote control application 503 (row with an application ID: 0004) being set to ON in Table 2. Here, the mirroring display is set to OFF, the mirroring display is not executed at the time point. The mirroring display may be preset to ON when the remote control application 503 is activated. In such a case, the remote control setting screen 508 is mirrored and displayed on the smart glasses 101 at a start timing of the remote control illustrated in FIGS. 6A to 6C.

After the web browser control application 516 is pressed on the control target application selection screen 514 illustrated in FIG. 7A, as described above, screen display as illustrated in FIG. 7B is provided. At this time, while the remote control is being executed, the mirroring display is not provided. This state is based on the remote control ON/OFF setting and the mirroring display ON/OFF setting for the web browser control application 516 (row with an application ID: 0006) being preset to ON and OFF, respectively, in Table 2. In a case where the mirroring display ON/OFF setting for the web browser control application is preset to ON, the web browser control screen 519 is mirrored and displayed on the smart glasses 101 at the timing of FIG. 7B.

FIGS. 8A and 8B illustrate examples of display to which the display transitions in a case where the user selects the pointer movement instruction control application 521 on the web browser control screen 519 illustrated in FIG. 7B. The displays in FIGS. 8A and 8B are provided when a control application that performs mirroring display is executed. FIG. 8A illustrates an example of display to be provided in a case where the mirroring display is started.

The remote control ON/OFF setting and the mirroring display ON/OFF setting for the pointer movement instruction control application (row with an application ID: 0008) are both preset to ON in Table 2. The remote control is continued and the mirroring display is started based on the preset values.

A pointer movement instruction control screen 533 is displayed on the smart watch 110, an arrow key 534 enables instructions to move the pointer 532 upward, downward, leftward, and rightward. Pressing of a TAP button at the center of the arrow key 534 enables a tap instruction. A BACK button 535 is used for ending the pointer movement instruction control application 521 and returning to the web browser control screen 519, which is a previous screen. If the user presses the END button 525, the pointer movement instruction control application 521, the web browser control application 516, and the remote control application 503 are ended, the screen is closed, and the initial screen 500 is displayed.

In FIG. 8A, a mirroring display message 536 indicating that mirroring display is being provided is additionally displayed in the field of vision of the user through the smart glasses 101. The mirroring display message 536 includes a name of a linked terminal of which a UI is mirrored and displayed so that the linked terminal is identifiable. In this example, the mirroring display message 536 indicates that a UI of the smart watch 110 named "Watch-1" is displayed. A mirroring display image 537 mirrors and displays a UI of the pointer movement instruction control screen 533 that is being displayed at this timing on the smart watch 110 named "Watch-1". In addition, the web browser screen 528 illustrated in FIG. 8A is moved in display position and reduced in screen size from the web browser screen 528 illustrated in FIG. 7B that had been displayed before the mirroring display. In this example, such an automatic control is added to ensure a region for displaying the above-described mirroring display image 537.

In a case where the user has operated a downward arrow of the arrow key 534 on the smart watch 110 as illustrated in FIG. 8A, the operation is reflected in the mirroring display image 537, and the pointer 532 on the web browser screen 528 moves downward in accordance with the instruction. The operation received on the smart watch 110 is reflected in the mirroring display image 537, thus enabling the user to re-confirm the operation performed by himself/herself, within the field of vision. This prevents a redundant operation and an erroneous operation. FIG. 8A illustrates a state in which the pointer 532 has moved to a position onto the input field 530.

Subsequently, if the user presses the TAP button provided at the center of the arrow key 534, as illustrated in FIG. 8B, the operation is similarly reflected in the mirroring display image 537, and the input field 530 is selected because the pointer 532 exists on the input field 530.

If the user presses the BACK button 535 on the pointer movement instruction control screen 533 illustrated in FIG. 8A or 8B, the screen displayed when the BACK button 535 is pressed is similarly reflected in the mirroring display image 537, and the screen returns to the web browser control screen 519 illustrated in FIG. 7B. The pointer movement instruction control application is then ended, and the web browser control application 516 enters an operating state. Thus, in accordance with information regarding the web browser control application 516 with the application ID "0006" in Table 2, the mirroring display is ended (set to OFF).

For a simple operation unit as illustrated in the mirroring display image 537 in FIGS. 8A and 8B, it may be possible for the user to input an operation into the smart watch 110 while seeing the mirroring display image 537, without visually checking the display on the smart watch 110. Thus, it is possible for the user to control an AR application only by performing a slight operation on his/her wrist without looking away, such as facing down toward the direction of the smart watch 110.

Figure 9A:
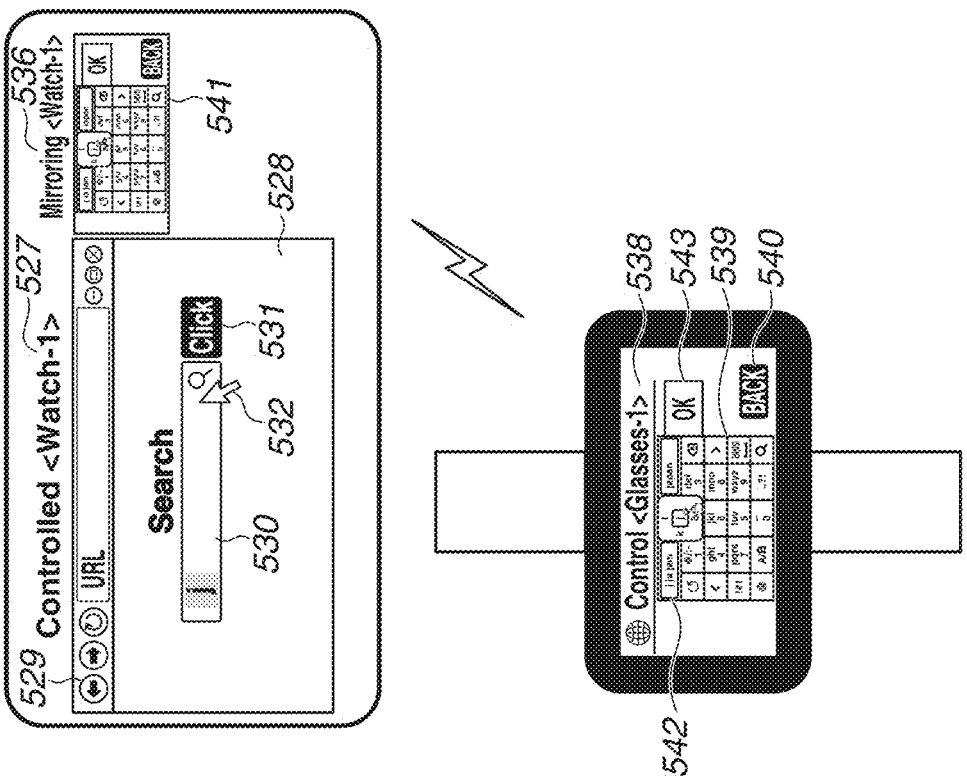
FIG. 9A illustrates an example of second display control which is executed on each device when mirroring display is performed in remote control.
Figure 9B:
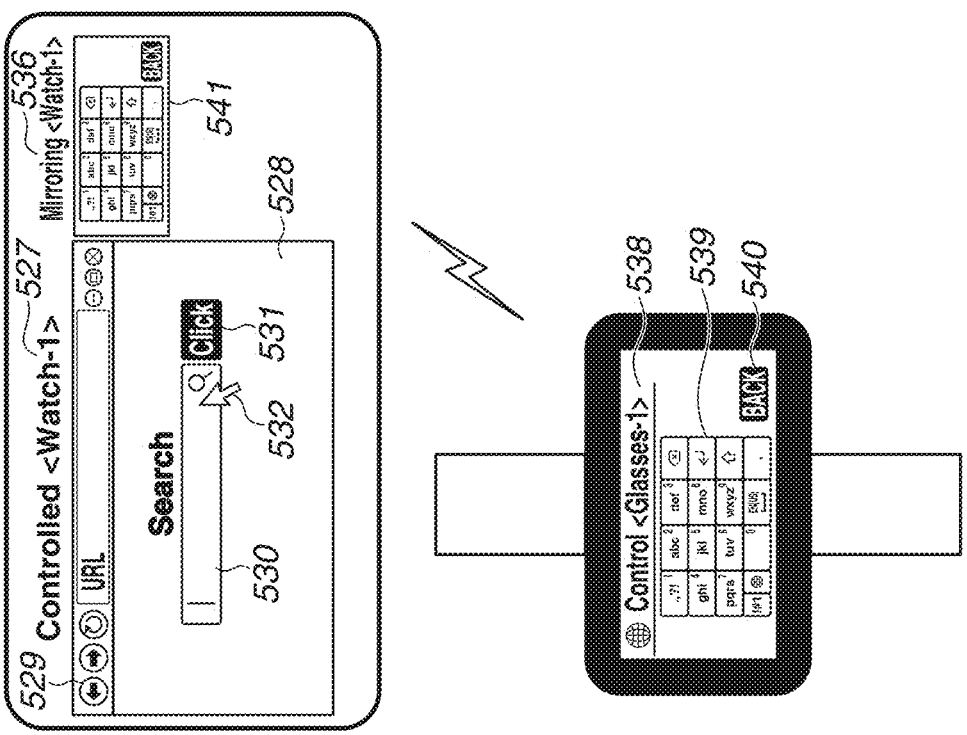
FIG. 9B illustrates an example of display control which is executed on each device when an operation performed during mirroring display is reflected.

FIGS. 9A and 9B each illustrate examples of display to which the display transitions in a case where the user selects the keyboard input instruction control application 522 on the web browser control screen 519 illustrated in FIG. 7B. The display in each of FIGS. 9A and 9B is different from the examples illustrated in FIGS. 8A and 8B that are provided when a control application for performing the mirroring display is executed. The mirroring display is started as illustrated in FIG. 9A. A keyboard input instruction control screen 538 is displayed on the smart watch 110. The keyboard input instruction control screen 538A then displays a keyboard 539 and a BACK button 540 for ending the keyboard input instruction control application 522 and returning to the web browser control screen 519, which is a previous screen. At this time, the keyboard input instruction control application 522 enters an operating state, so that the mirroring display is restarted (set to ON), in accordance with information regarding the keyboard input instruction control application with an application ID "0008" in Table 2, and a mirroring display image 541 is mirrored and displayed. In the mirroring display image 541, a UI of the keyboard input instruction control screen 538 displayed at this timing on the smart watch 110 named "Watch-1" is mirrored and displayed.

If the user selects a character "j", for example, on the keyboard 539 illustrated in FIG. 9B, input candidate words starting with "j" are displayed in a candidate word list 542. An OK button 543 for confirming selection when the user selects a word from the candidate word list 542 is also displayed. Subsequently, the UI of the keyboard input instruction control screen 538 at this timing is reflected in the mirroring display image 541, and the selected character "j" is also displayed in the input field 530 on the web browser screen 528.

For example, if the user selects "Japan" from among candidate words in the candidate word list 542 illustrated in FIG. 9B, the selection is reflected in the mirroring display image 541, and "Japan" is displayed in the input field 530 on the web browser screen 528 in a candidate-selected state. If the user presses the OK button 543 in this state, "Japan" is similarly reflected in the mirroring display image 541, and "Japan" in the input field 530 on the web browser screen 528 is displayed in a confirmed state. Thus, the web browser screen 528 enters a next character input standby state.

If the user presses a BACK button 540 on the keyboard input instruction control screen 538 illustrated in FIG. 9A or 9B, the screen returns to the web browser control screen 519 illustrated in FIG. 7B. The keyboard input instruction control application 522 ends at this timing, and the web browser control application 516 enters an operating state. Thus, in accordance with information regarding the web browser control application 516 with the application ID "0006" in Table 2, the mirroring display is ended (set to OFF).

Figure 10C:
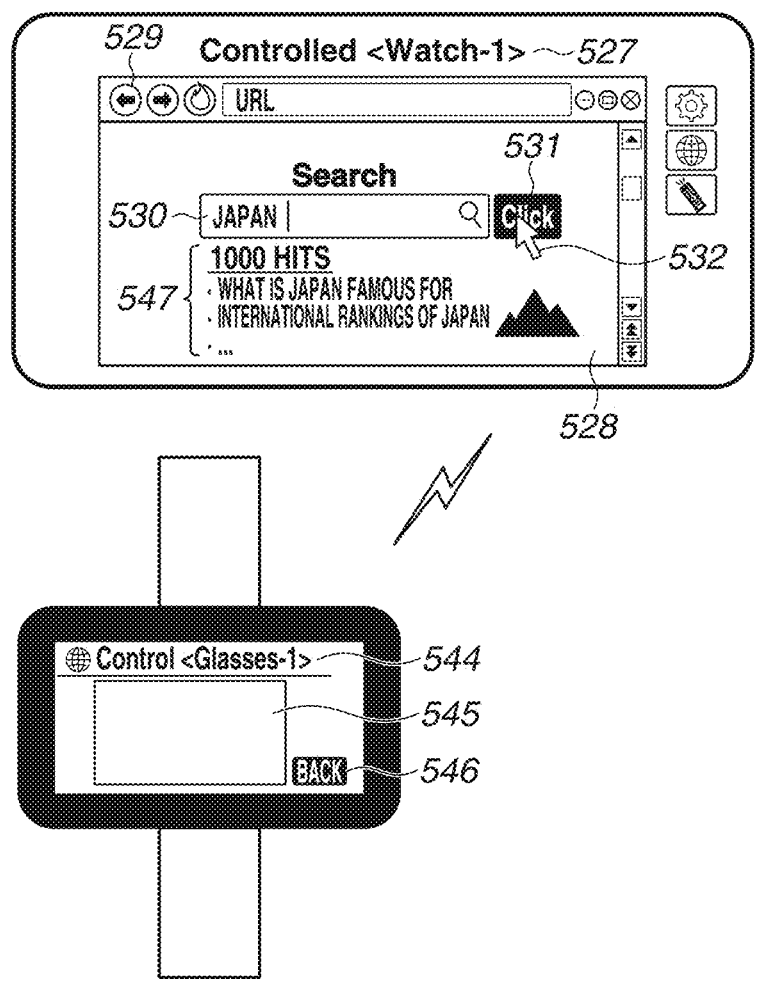
FIG. 10C illustrates an example of third display control which is executed on each device in a case where mirroring display is not performed in remote control.

FIGS. 10A to 10C each illustrate an example of a display to which the display transitions in a case where the user selects the touch pad instruction control application (icon) 523 on the web browser control screen 519 illustrated in FIG. 7B. Each display is provided when a control application that does not perform the mirroring display is executed. An application on the web browser screen 528 is controlled without the mirroring display, as illustrated in FIG. 10A. A touch pad instruction control screen 544 is displayed on the smart watch 110. The touch pad instruction control screen 544 displays thereon a touch pad region 545 for issuing a touch pad instruction, and a BACK button 546 for ending the touch pad instruction control application and returning to the web browser control screen 519, which is a previous screen. In accordance with information regarding the touch pad instruction control application 523 with an application ID "0010" in Table 2, the touch pad instruction control application continues the remote control with the mirroring display set to OFF. Thus, when the state transitions from the state illustrated in FIG. 7B, to the state illustrated in FIG. 10A, the display on the smart glasses 101 remains unchanged. If the user moves his/her finger in the touch pad region 545 in FIG. 10A in such a manner as to slide the finger rightward, the pointer 532 on the web browser screen 528 also moves rightward in conjunction with the movement. FIG. 10A illustrates a state in which the pointer 532 has moved to a position on a Click button 531.

Subsequently, if the user taps his/her finger twice in the touch pad region 545 illustrated in FIG. 10B, the Click button 531 designated by the pointer 532 on the web browser screen 528 is clicked in conjunction with the movement. Web search is accordingly executed based on the word "Japan" entered in the input field 530. FIG. 10C illustrates a screen to be displayed after the search operation, and a search result is displayed as in the web browser screen 528. The number of search results (hits), link information regarding a link to a hit article, and image information are displayed in a list in a search result information region 547 on the web browser screen 528.

If the user presses a BACK button 546 on the touch pad instruction control screen 544 illustrated in FIGS. 10A to 10C, the screen returns to the web browser control screen 519 illustrated in FIG. 7B.

The above-described UI operations illustrated in FIGS. 6A to 10C enable the setting of the mirroring display to be set to ON/OFF depending on an operated application when an application on the smart glasses 101 is remotely controlled from the smart watch 110.

In a series of UI operations as illustrated in FIGS. 6A to 10C, the smart glasses 101 are capable of receiving an instruction issued by the user via the operation unit 304, also when the smart glasses 101 are remotely controlled from the smart watch 110, as described above. Thus, while a UI of the smart watch 110 is being mirrored and displayed, an operation performed by the user via the operation unit 304 of the smart glasses 101 sometimes interrupts. In this case, the smart glasses 101 once end the mirroring display. In this case, if the smart watch 110 redetects an operation of an application for which the mirroring display ON/OFF setting is set to ON in Table 2, and issues a mirroring instruction to the smart glasses 101, the smart glasses 101 restart mirroring start.

In the use case of the UI operations illustrated in FIGS. 6A to 10C, the mirroring display is started by the user selecting the control target application selection button 510 in FIG. 6B, and then pressing the web browser control application 516 in FIG. 7A. In other words, this is a use case where the application management unit 328 of the smart watch 110 detects operation information regarding an operation on the web browser control application 516 on the smart watch 110 in response to receiving a notification of an "input made by the user via the operation unit 325" (step S401).

In contrast, as a different use case, there is also a use case where the application management unit 328 of the smart watch 110 activates a control instruction application on the smart watch 110 in response to receiving a control instruction application activation request from the smart glasses 101 via the communication unit 301. At the time, the smart watch 110 that has received a notification activates a control instruction application, and detects the activation of the control instruction application (step S401). The different use case will be briefly described with reference to FIGS. 6A to 6C.

First of all, in the case of this use case, the control target application selection button 510 in FIG. 6B is not selected, a Close button (not illustrated) on the remote control setting screen 508 is pressed while the remote control in the background is being executed and the initial screen 500 remains displayed.

Subsequently, in a standby state on the initial screen 500, for example, the user selects the input field 530 on the web browser screen 528 displayed on the smart glasses 101, using the operation unit 304 of the smart glasses 101. The application management unit 309 then detects the selection of the input field 530, and the application management unit 309 requests the smart watch 110 to activate the keyboard input instruction control application 522 illustrated in FIGS. 6A to 6C, via the communication unit 301.

Subsequently, if the smart watch 110 receives the request for activation of the keyboard input instruction control application 522, the smart watch 110 activates the keyboard input instruction control application 522, and displays the keyboard input instruction control screen 538. The user makes an input using the displayed keyboard input instruction control screen 538.

After that, if the user ends the character input and presses a Close button (not illustrated) on the keyboard input instruction control screen 538, the smart watch 110 ends the keyboard input instruction control application 522, and the smart watch 110 returns to the standby state on the initial screen 500 again.

According to the above-described exemplary embodiment, it is possible to enhance the usability in cooperation executed when a function of an application on smart glasses is remotely controlled by a smart watch, using the AR technique.

In the present exemplary embodiment, the description has been provided using the term "mirroring display", but a display image (e.g., the mirroring display image 537 in FIG. 8A) exactly matching an operation unit or operability displayed on the smart watch 110 is not necessarily to be projected by the smart glasses 101. It is sufficient that virtual display of an operation unit is realized to such a degree that the operability is recognizable, and the mirroring display may be realized by any image indicating an operation unit customized by the user, an application provider, or the smart glasses 101.

Second Exemplary Embodiment

The user uses the smart watch 110 and the smart glasses 101 in combination in various usage environments. Thus, in consideration of a usage environment and an environment change during cooperation between these devices, it is possible to further enhance the usability for the user at the time of the cooperation.

In the second exemplary embodiment, an exemplary embodiment in which a usage environment and an environment change during cooperation are considered will be described based on a difference from the first exemplary embodiment.

In the software module configuration (FIG. 3B) of the smart watch 110 according to the present exemplary embodiment, the application management unit 328 is capable of presetting, as application-based glasses cooperation information, a function to be enabled in each usage environment during cooperation with the smart glasses 101. The application management unit 328 is capable of presetting also a function to be activated when a change in usage environment of the user is detected. These settings are made for each of various applications on the smart watch 110. As an example, settings are predetermined as indicated in Table 3.

TABLE 3

Application-based glasses cooperation information

| | | Remote Control | | Mirroring Display | | Watch Screen Lock | |
|---|---|---|---|---|---|---|---|
| Application ID | Application Name | ON/OFF setting | Usage environment setting | ON/OFF setting | Usage environment setting | ON/OFF setting | Activation environment |
| 0001 | Application0001 | ON | "Crowded train or walking" | ON | Crowded train | ON | Crowded train |
| 0002 | Application0002 | ON | — | ON | Walking | ON | Walking |
| 0003 | Application0003 | OFF | — | OFF | While directly viewing linked screen | ON | — |

In glasses cooperation that is based on the application-based glasses cooperation information in Table 3, in which usage environment the remote control and the mirroring display described in the first exemplary embodiment are enabled is predetermined. In the second exemplary embodiment, not only the "ON/OFF setting" for setting whether to enable or disable a function, but also a usage environment in which the function is to be enabled (set to ON) is set as a "usage environment setting".

For example, an application with an application ID "0001" in Table 3 will be described as an example. First of all, the ON/OFF setting of remote control is set to "ON", and a usage environment setting is set to "crowded train or walking". In this case, if it is detected that a user environment is "crowded train or walking", the remote control function is started. After that, if it is detected that a user environment is neither "crowded train" nor "walking", the remote control function is ended. The ON/OFF setting of the mirroring display for the application with an application ID "0001" is also set to "ON", and a usage environment setting is set to "crowded train". In this case, if it is detected that a user environment is "crowded train", the mirroring display provided by the mirroring display function is started. In addition, if it is detected that a user environment is not "crowded train", the mirroring display provided by the mirroring display function is ended.

The application management unit 309 executes an environment change detection as to whether a user environment is "crowded train" or "walking", based on information from the sensor unit 209 or the camera 210 included in the smart glasses 101. The application management unit 309 also manages an environmental status indicating a current user environment, in the ROM 203 or the RAM 204 via the storage unit 302. If the smart glasses 101 detect an environment change using the application management unit 309, the smart glasses 101 notify the smart watch 110 of the environment change detection. If the smart watch 110 receives the environment change detection, the smart watch 110 checks an application currently being operated by the smart watch 110. Then, in a case where the smart watch 110 is operating any application, the "remote control" ON/OFF setting and the "mirroring display" ON/OFF setting are set to ON or OFF, based on the application-based glasses cooperation information in Table 3.

There are applications for which "- (hyphen)" is designated in usage environment settings in Table 3. This indicates that a usage environment is undesignated. In this case, a function is enabled or disabled in accordance with the "ON/OFF setting" in all environments. There is an application for which "while directly viewing a linked screen" is designated in a usage environment setting in Table 3. This indicates a state in which the user is physically viewing the screen (the display 222) of the linked smart watch 110 through a lens of the smart glasses 101. As for an application with an application ID "0003" in Table 3, the ON/OFF setting of mirroring display is set to OFF, and a usage environment setting is set to "while directly viewing a linked screen". In this case, if the user directly views the screen of the smart watch 110 during the mirroring display on the smart glasses 101, the mirroring display is ended. Moreover, if the user looks away from the screen of the smart watch 110, the mirroring display is restarted. With this configuration, the user is freed from vexatiousness due to duplicate display of the same screen when, for example, the same screen is also mirrored and displayed on the smart glasses 101 while the user is directly viewing the screen of the smart watch 110.

Furthermore, it has been described that, in a case where "crowded train or walking" is set in a usage environment setting as described above, this setting indicates "crowded train" or "walking". As a similar setting, if "while directly viewing a linked screen and walking" is set in a usage environment setting, which is not described in the case example in Table 3, this setting indicates "while directly viewing a linked screen" and "walking".

As described above, the definition of an "environment" in this second exemplary embodiment is not limited to an environment itself surrounding the user, such as "crowded train", and an environment including a user state such as "walking" or "while directly viewing a linked screen" is defined as an "environment," as indicated in the usage environment settings in Table 3. Table 3 provides an example in which values such as "crowded train" and "walking" are managed in the "usage environment setting" for the sake of explanatory convenience. In practice, setting value IDs allocated to the respective environments may be managed in Table 3.

Furthermore, in the second exemplary embodiment, a watch screen lock function of locking the screen of the smart watch 110 in a case where a specific environment change is detected is also provided. This function is specified on the columns of "ON/OFF setting" and "activation environment" on a "watch screen lock" column in Table 3. For example, as for an application with an application ID "0001" in Table 3, the ON/OFF setting on the "watch screen lock" column is set to "ON", and the activation environment is set to "crowded train". In this case, it is indicated that, if the transition of a user environment from an "environment other than a crowded train environment" to the "crowded train environment" is detected, the watch screen lock function is executed. The watch screen lock function is used for the purpose of reducing the possibility that another user touches the screen (the display unit 111) of the smart watch 110 in a crowded train state, and erroneous control is executed in the remote control on the smart glasses 101. If the screen of the smart watch 110 is once locked when the user enters the crowded train state, erroneous control caused by touch from another person can be prevented.

After the screen is locked by the watch screen lock function, prompting the user to log into the smart watch 110 again by, for example, fingerprint authentication using the screen ensures a screen operation in a state in which the authenticated user touches the screen.

As another intended purpose of the watch screen lock function, locking the screen of the smart watch 110 when the state of the user transitions to "walking" is also effective. When the user remotely controls the smart glasses 101 using the screen of the smart watch 110, the user sometimes directly views the screen of the smart watch 110. If the user starts walking in this state, the user walks while directly viewing the screen of the smart watch 110, and cannot notice a dangerous environment possibly existing around the user. Thus, by once locking the screen when the state of the user transitions to "walking", the user's attention to the screen of the smart watch 110 can be once distracted, and an opportunity to give an eye to a surrounding environment can be provided. When the screen is locked by the watch screen lock function at this time, a warning may be displayed on the screen.

In addition, when the user unlocks the screen lock again while the user continues to be in a "walking" state, a guidance to execute the mirroring display may be provided. At the time, a series of processes of displaying a warning when the screen is locked, and executing the mirroring display after the screen lock is unlocked may be included in the "watch screen lock" function.

Furthermore, as a method of unlocking the screen lock executed by the "watch screen lock" function, a "watch screen unlock" function not described in Table 3 may be provided as one of cooperative functions. For example, a method of designating an environment indicating "stopped (walking OFF)" in the usage environment setting in Table 3, and setting the ON/OFF setting of "watch screen unlock" to ON at the time is conceivable.

Figure 11:
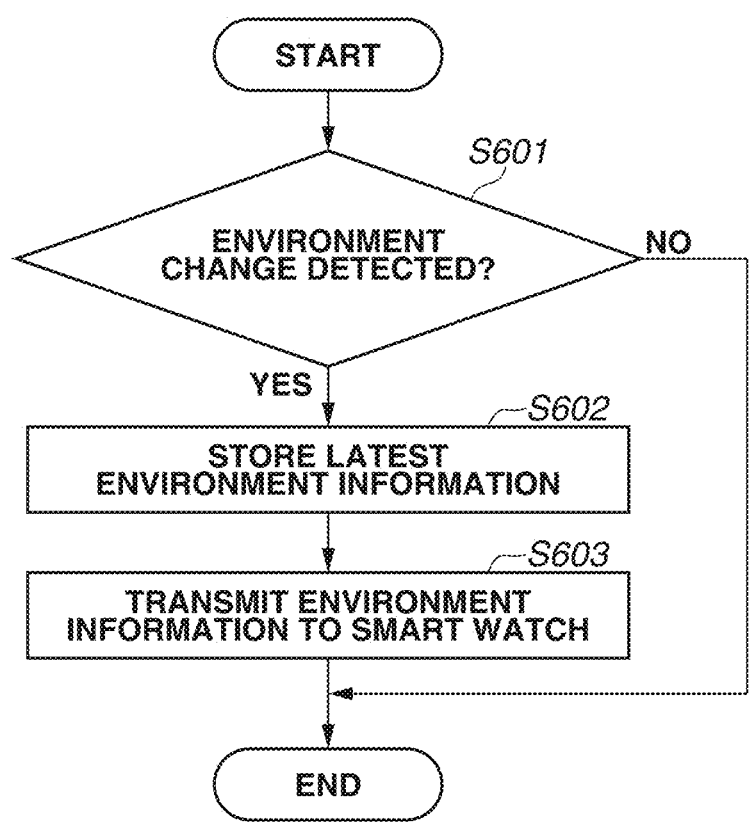
FIG. 11 is a flowchart illustrating environment change detection processing to be executed by a glasses-type information device that cooperates with a wearable terminal according to a second exemplary embodiment.

FIGS. 11 to 13 are flowcharts illustrating processing featuring the second exemplary embodiment. Each flowchart is executed in the smart watch 110 and the smart glasses 101 in a pairing state when the smart watch 110 controls an application installed on the smart glasses 101. In FIGS. 11 to 13, the smart watch 110 and the smart glasses 101 are assumed to have been subjected to pairing using the pairing unit 327 and the pairing unit 308, respectively.

FIG. 11 is a flowchart illustrating processing of transmitting environment change detection to the smart watch 110 when a user environment change is detected in the smart glasses 101. The application management unit 309 executes the operations in the steps included in this flowchart.

In step S601, the application management unit 309 detects whether the environment surrounding the user has been changed based on information from the sensor unit 209 or the camera 210. For example, using the sensor unit 209, the application management unit 309 detects whether the user is walking, based on information from the GPS or the acceleration sensor. In addition, the application management unit 309 detects whether the user is in the crowded train state, based on information from the proximity sensor included in the sensor unit 209 or image information from the camera 210. Furthermore, in a case where the camera 210 includes a function of capturing an image of an object in almost the same direction as an eye direction of the user of the smart glasses 101, the application management unit 309 detects whether the user is directly viewing the screen of the linked device (the smart watch 110) that is in a cooperation state, based on image information from the camera 210. The above-described detection method is an example, and the application management unit 309 detects an environment change based on a function included in the smart glasses 101.

In a case where it is determined in step S601 that an environment change has not been detected (NO in step S601), the application management unit 309 ends the processing of the flowchart illustrated in FIG. 11. In a case where an environment change has been detected (YES in step S601), the processing proceeds to step S602. In step S602, the application management unit 309 stores the detected environment information as latest environment information into the RAM 204 via the storage unit 302. Then, in step S603, the application management unit 309 notifies the smart watch 110 of the detected environment information.

The latest environment information is stored into a table as illustrated in Table 4.

TABLE 4

Latest Environment Information

| Environment | State |
|---|---|
| Walking | ON |
| Crowded Train | OFF |
| While Directly Viewing Linked Screen | OFF |

The application management unit 309 presets environment items as listed on an "environment" column in Table 4, which are detectable by the application management unit 309. Then, for example, in a case where an environment changes from a stopped state to a walking state, the "walking" state is updated to ON. After that, in a case where an environment changes from the walking state to the stopped state, the "walking" state is updated to OFF.

FIG. 12 is a flowchart illustrating processing of transmitting, when the smart watch 110 receives the environment information from the smart glasses 101, control information regarding the remote control and/or the mirroring display that has/have been determined based on the received environment information, to the smart glasses 101. The application management unit 328 executes the operations in the steps included in this flowchart.

First of all, in step S611, the application management unit 328 determines whether the environment information has been received from the smart glasses 101. In a case where environment information has been received (YES in step S611), the processing proceeds to step S612. In a case where environment information has not been received (NO in step S611), the processing proceeds to step S613. In step S612, the application management unit 328 stores the received latest environment information (Table 4) into the RAM 224 via the storage unit 323. The operation in step S613 is equivalent to that in step S401. If the application management unit 328 detects an operation information about an operation on an apparatus (YES in step S613), the processing proceeds to step S614. If the application management unit 328 detects no operation information about an operation on an apparatus (NO in step S613), the processing proceeds to step S621.

The operations in step S621 and step S622 are respectively equivalent to the operations in step S408 and step S409. The operation in step S623 is equivalent to an operation obtained by combining the both operations in step S410 and step S411. In step S623, in a case where cooperative functions that are to be executed on the smart glasses 101, other than the remote control function and the mirroring display function, are provided in the above-described application-based glasses cooperation information (Table 3), all of these cooperative functions are ended as well. The smart glasses 101 are also notified of the end result.

In step S614, the application management unit 328 acquires the latest environment information (Table 4) stored in step S612. In step S615, the application management unit 328 determines whether a "cooperative function to be executed on the smart watch 110" that satisfies a preset value in the usage environment setting in Table 3 is included based on an environment of which the state is set to ON in Table 4. If the "cooperative function to be executed on the smart watch 110" is included (YES in step S615), the processing proceeds to step S616. In step S616, the cooperative function is executed by the smart watch 110". Here, the "cooperative function to be executed on the smart watch 110" is the "watch screen lock" function in the example in Table 3. The watch screen lock function is a function of locking the screen of the smart watch 110, so that the watch screen lock function is to be executed on the smart watch 110. As described above in conjunction with Table 3, the "watch screen lock" function may include a function of displaying a warning in the locked state and a function of executing mirroring display after the screen lock is unlocked. Moreover, as similarly described above in conjunction with Table 3, the "watch screen unlock" function is also included in the "cooperative function to be executed on the smart watch 110".

Subsequently, in step S617, the application management unit 328 determines whether a "cooperative function to be executed on the smart glasses 101" that satisfies a preset value in the usage environment setting in Table 3 is included based on an environment of which the state is set to ON in Table 4. If the "cooperative function to be executed on the smart glasses 101" is included (YES in step S617), the processing proceeds to step S618. In step S618, the application management unit 328 notifies the smart glasses 101 of state information about the cooperative function. Here, the "cooperative function to be executed on the smart glasses 101" includes the "remote control" function and the "mirroring display" function in the example in Table 3. The remote control function controls an application on the smart glasses 101. The mirroring display function performs mirroring display on the smart glasses 101. Thus, these functions are to be executed on the smart glasses 101. The state information about the cooperative function of which the smart glasses 101 are notified in step S618 includes determination results obtained by determining whether remote control and mirroring display are set to ON or OFF, based on Table 4, for example. When the notification is made, information regarding an application ID and an application name of an application of which operation information has been detected in step S613 is also included in the state information.

Heretofore, the functions to be executed on the smart watch 110 and the functions to be executed on the smart glasses 101 that are set in Tables 3 and 4 have been described. Nevertheless, information for determining a function into which a target cooperative function falls may be made settable by further adding an attribute to the application-based glasses cooperation information (Table 3), or may be managed in another table.

In step S619, the application management unit 328 determines whether a function that is being performed in cooperation with the smart glasses 101 is included. In the determination, if it is determined that a "cooperative function to be executed on the smart glasses 101" that satisfies a preset value in the usage environment setting in Table 3 is included, based on an environment of which the state is set to ON in Table 4, as in step S617, and it is further determined that a function to be enabled (set to ON) is included, it is determined that a function being in cooperation is included. In addition to such a determination method, a past state information notification history in step S618 may be stored in the storage unit 323, and it may be determined whether a function that is being performed in cooperation is included, based on the past notification history. If it is determined in step S619 that a function that is being performed in cooperation with the smart glasses 101 is included (YES in step S619), the processing proceeds to step S620. If it is determined in step S619 that a function that is being performed in cooperation with the smart glasses 101 is not included (NO in step S619), the processing in the flowchart illustrated in FIG. 12 is ended.

The operation in step S620 is equivalent to those in step S404, S405, or S407 of FIG. 4. For example, if the remote control function is in cooperation, user instruction information is transmitted as application operation information. If the mirroring display function is in cooperation, the UI information is transmitted as application operation information.

FIG. 13 is a flowchart illustrating processing to be executed when the smart glasses 101 receive, from the smart watch 110, "state information for setting ON/OFF a cooperative function" or "application operation information corresponding to an in-cooperation cooperative function". The application management unit 309 executes processing steps included in this flowchart.

In step S631, the application management unit 309 determines whether "state information about a cooperative function" has been received from a linked device (the smart watch 110). In a case where the "state information about a cooperative function" has been received (YES in step S631), the processing proceeds to step S632. In a case where "state information about a cooperative function" has not been received (NO in step S631), the processing proceeds to step S633. The "state information about a cooperative function" to be received in step S631 is information included in the notification from the smart watch 110 transmitted in step S618 or S623 of FIG. 12.

In step S632, the received state information is reflected as processing to be executed on the smart glasses 101. More specifically, in a case where the state information indicating the remote control ON has been received, the control of an application on the smart glasses 101 that is controllable by an application on the smart watch 110 that has an application ID included in the state information transmitted in step S618 is started. In a case where the state information indicating the remote control OFF has been received, the control of the application is ended. In a case where state information indicating the mirroring display ON has been received, the application management unit 309 activates a mirroring display application on the smart glasses 101, and the mirroring display is accordingly started. In a case where the state information indicating the mirroring display OFF has been received, the mirroring display is ended.

In step S633, the application management unit 309 determines whether "application operation information corresponding to an in-cooperation cooperative function" has been received from the smart watch 110. In a case where "application operation information corresponding to an in-cooperation cooperative function" has been received (YES in step S633), the processing proceeds to step S634. In a case where "application operation information corresponding to an in-cooperation cooperative function" has not been received (NO in step S633), the processing proceeds to step S635. The "application operation information corresponding to an in-cooperation cooperative function" is information of which the smart glasses 101 are notified by the smart watch 110 in step S620 of FIG. 12.

In step S634, the received application operation information is reflected as processing to be executed on the smart glasses 101. More specifically, in a case where the in-cooperation cooperative function is the remote control function, control that is based on user instruction information serving as the application operation information is reflected in an application on the smart glasses 101. In a case where the in-cooperation cooperative function is the mirroring display function, the application operation information is the UI information corresponding to information regarding display content to be mirrored and displayed on the smart glasses 101. In this example, for example, display content to be changed by the user operating an application on the smart watch 110 is the UI information, and the mirroring display is updated based on the UI information.

The operations in steps S635 to S639 are equivalent to those in steps S424 to S428, and thus, descriptions thereof will be omitted.

According to the above-described flowcharts, it is possible to enhance the usability reflecting a usage environment of the user, in the cooperation that is executed when a smart glass function is remotely controlled by a smart watch.

In the second exemplary embodiment, the smart glasses 101 perform environment change detection and notify the smart watch 110 of a result of the environment change detection (FIG. 11). The environment change detection may be executed by another configuration. For example, the smart watch 110 may execute the environment change detection using the application management unit 328 based on information from the sensor unit 229 included in the smart watch 110. In addition, environment modes, such as a normal mode, a crowded train mode, and a walking mode, may be prepared in the smart glasses 101 or the smart watch 110, and the user may be enabled to select any environment mode from among these environment modes. Then, the mode switching of an environment mode that is performed by the user may be used as an alternate method of environment change detection.

In the above-described first and second exemplary embodiments, the configuration of each wearable terminal, the configurations of software modules, and flowcharts regarding application notification of a wearable terminal have been described. These are only examples, and the present invention is not limited to these.

According to each of the above-described exemplary embodiments, and the present invention including a combination of these, a high-performance operation unit for dealing with various operations to be used for various applications is not necessarily to be provide in smart glasses. This eliminates design restrictions imposed to mount a number of such operation units in smart glasses. In other words, it can be said that the present invention contributes largely not only to enhancement in usability but also to design improvement of the smart glasses, and might also contribute to weight saving.

Other Exemplary Embodiments

The present invention also includes an apparatus or a system obtained by appropriately combining the above-described exemplary embodiments, and a method for the same.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention is not limited to the above-described exemplary embodiments, and various changes and modifications can be made without departing from the spirit and the scope of the present invention. Thus, the following claims are appended to publicize the scope of the present invention.

According to an exemplary embodiment of the present invention, it is possible to enhance usability in executing cooperation between a glasses-type information device and a different wearable terminal (smart watch, etc.) and remotely controlling the glasses-type information device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A glasses-type information device configured to execute an application, the glasses-type information device comprising:
   at least one memory storing instructions; and
   at least one processor executing the instructions causing the glasses-type information device to:
   execute display control that causes an image corresponding to an operation screen obtained from a linked device worn by a user to be projected in a field of vision of a user wearing the glasses-type information device, the projected operation screen being usable to remotely control an application executing on the glasses-type information device, wherein the remote control is being executed by the linked device; and
   execute function control of the application executing on the glasses-type information device based on a command received from the linked device in accordance with a user operation performed by the user on the linked device,
   wherein the field of vision of the user wearing the glasses-type information device includes the projected operation screen obtained from the linked device displayed together with a user interface of the application executing on the glasses-type information device.

2. The glasses-type information device according to claim 1, wherein the image corresponding to the operation screen is an image corresponding to a command received from the linked device.

3. The glasses-type information device according to claim 1, wherein the instructions further cause the glasses-type information device to execute display control of reflecting the user operation performed on the linked device, in the projected image corresponding to the operation screen based on the command received from the linked device.

4. The glasses-type information device according to claim 1, wherein the instructions further cause the glasses-type information device to provide the user with a projection setting for designating whether to project the image corresponding to the operation screen in the remote control.

5. The glasses-type information device according to claim 4, wherein, in the projection setting, designating whether to project the image corresponding to the operation screen is performable for each application of the glasses-type information device.

6. The glasses-type information device according to claim 4, wherein, in the projection setting, designating whether to project the image corresponding to the operation screen is performable in accordance with an environment detected with the glasses-type information device.

7. The glasses-type information device according to claim 1, wherein the glasses-type information device includes a binocular smart glass, a monocular smart glass, and a head-mounted display.

8. The glasses-type information device according to claim 1, wherein the glasses-type information device includes therein a network module for directly connecting to the Internet.

9. A non-transitory computer-readable storage medium storing a computer program for causing a computer to execute a method for a glasses-type information device configured to execute an application, the method comprising:
- executing display control that causes an image corresponding to an operation screen obtained from a linked device worn by a user to be projected in a field of vision of a user wearing the glasses-type information device, the projected operation screen being usable to remotely control an application executing on the glasses-type information device, wherein the remote control is being executed by the linked device; and
- executing function control of the application executing on the glasses-type information device based on a command received from the linked device in accordance with a user operation performed by the user on the linked device,
- wherein the field of vision of the user wearing the glasses-type information device includes the projected operation screen obtained from the linked device displayed together with a user interface of the application executing on the glasses-type information device.

10. The non-transitory computer-readable storage medium according to claim 9, wherein the image corresponding to the operation screen is an image corresponding to a command received from the linked device.

11. The non-transitory computer-readable storage medium according to claim 9, wherein the method further comprises executing the display control of reflecting the user operation performed on the linked device, in the projected image corresponding to the operation screen, based on the command received from the linked device.

12. The non-transitory computer-readable storage medium according to claim 9, wherein the method further comprises providing the user with a projection setting for designating whether to project the image corresponding to the operation screen, in the remote control.

13. The non-transitory computer-readable storage medium according to claim 12, wherein, in the projection setting, designating whether to project the image corresponding to the operation screen is performable for each application of the glasses-type information device.

14. The non-transitory computer-readable storage medium according to claim 12, wherein, in the projection setting, designating whether to project the image corresponding to the operation screen is performable in accordance with an environment detected with the glasses-type information device.

15. The non-transitory computer-readable storage medium according to claim 9, wherein the glasses-type information device includes a binocular smart glass, a monocular smart glass, or a head-mounted display.

16. The non-transitory computer-readable storage medium according to claim 9, wherein the glasses-type information device includes therein a network module for directly connecting to the Internet.

17. A method for a glasses-type information device executing an application, the method comprising:
- executing display control that causes an image corresponding to an operation screen obtained from a linked device worn by a user to be projected in a field of vision of a user wearing the glasses-type information device, the projected operation screen being usable to remotely control an application executing on the glasses-type information device, wherein the remote control is being executed by the linked device; and
- executing function control of the application executing on the glasses-type information device based on a command received from the linked device in accordance with a user operation performed by the user on the linked device,
- wherein the field of vision of the user wearing the glasses-type information device includes the projected operation screen obtained from the linked device displayed together with a user interface of the application executing on the glasses-type information device.

* * * * *